United States Patent
Watanabe et al.

(10) Patent No.: US 10,295,953 B2
(45) Date of Patent: May 21, 2019

(54) IMAGE FORMING APPARATUS INCLUDING A MOVABLE BELT

(71) Applicant: CANON KABUSHIKI KAISHA, Tokyo (JP)

(72) Inventors: Toshiyuki Watanabe, Yokohama (JP); Ryosuke Takahashi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/812,467

(22) Filed: Nov. 14, 2017

(65) Prior Publication Data
US 2018/0136603 A1 May 17, 2018

(30) Foreign Application Priority Data
Nov. 16, 2016 (JP) .................................. 2016-223132

(51) Int. Cl.
*G03G 15/01* (2006.01)
*G03G 21/16* (2006.01)
(Continued)

(52) U.S. Cl.
CPC ......... *G03G 21/16* (2013.01); *G03G 15/0136* (2013.01); *G03G 21/168* (2013.01); *G03G 21/1623* (2013.01); *G03G 21/1671* (2013.01); *G03G 21/18* (2013.01); *G03G 21/1853* (2013.01); *G06K 15/12* (2013.01); *H04N 1/036* (2013.01); *G03G 2221/1678* (2013.01); (Continued)

(58) Field of Classification Search
None
See application file for complete search history.

(56) References Cited

U.S. PATENT DOCUMENTS 7,466,939 B2 * 12/2008 Nakashima ........ G03G 21/1839
399/110
8,849,156 B2 9/2014 Mizuno et al.
(Continued)

FOREIGN PATENT DOCUMENTS

JP 2003112446 A 4/2003
JP 2003316233 A 11/2003
(Continued)

*Primary Examiner* — Victor Verbitsky
(74) *Attorney, Agent, or Firm* — Rossi, Kimms & McDowell LLP

(57) ABSTRACT

An image forming apparatus includes a cartridge including a photosensitive drum; an endless belt configured to transfer the toner image formed on the drum; an endless belt supporting member movable between a contacting position for contacting the belt to the drum and a non-contacting position retracted from the contacting position away from the drum; and a cartridge supporting member movable between an image forming position in which the drum contacts the belt taking the contacting position and a non-image-forming position in which the cartridge is movable from a inside to a outside of the main assembly. By movement of the belt from the contacting position to the non-contacting position, a space capable of accommodating at least a part of the cartridge supporting member taking the non-image-forming position and/or the cartridge supported by the cartridge supporting member taking the non-image-forming position is provided.

10 Claims, 21 Drawing Sheets

(51) Int. Cl.
    *G03G 21/18*     (2006.01)
    *G06K 15/12*     (2006.01)
    *H04N 1/036*     (2006.01)

(52) U.S. Cl.
    CPC ............... *G03G 2221/1684* (2013.01); *G03G 2221/18* (2013.01); *G03G 2221/1869* (2013.01)

(56) References Cited

U.S. PATENT DOCUMENTS

| | | |
|---|---|---|
| 9,146,492 B2 | 9/2015 | Suzuki |
| 9,442,457 B2 | 9/2016 | Maeda et al. |
| 9,519,260 B2 | 12/2016 | Yoshimura et al. |

FOREIGN PATENT DOCUMENTS

| | | |
|---|---|---|
| JP | 2007213025 A | 8/2007 |
| JP | 2007219026 A | 8/2007 |
| JP | 2009282397 A | 12/2009 |
| JP | 2011070142 A | 4/2011 |
| JP | 2016004062 A | 1/2016 |

\* cited by examiner

IMAGE FORMING APPARATUS INCLUDING A MOVABLE BELT

FIELD OF THE INVENTION AND RELATED ART

The present invention relates to an electrophotographic image forming apparatus which forms an image on recording medium only when process cartridges, which are removably installable in the main assembly of the apparatus, are properly disposed in the main assembly.

Here, an electrophotographic image forming apparatus (which hereafter may be referred to simply as "image forming apparatus") means an apparatus which forms an image on recording medium with the use of an electrophotographic image formation process. Examples of image forming apparatus include an electrophotographic copying machine, an electrophotographic printing machine (color LED printer, for example), a facsimileing machine, a word processor, and the like. Further, they include both monochromatic and color image forming apparatuses. A "cartridge" means a process cartridge or a development cartridge, which is removably installable in the main assembly of an image forming apparatus. It contributes to the process of forming an image on recording medium when it is properly disposed for image formation in the main assembly of an image forming apparatus. A "process cartridge" means a cartridge in which an electrophotographic photosensitive drum, and at least one of processing means, more specifically, a charging means, a developing means, and a cleaning means, are integrally disposed, and which is removably installable in the main assembly of an image forming apparatus. That is, a "process cartridge" includes a cartridge in which an electrophotographic photosensitive drum, and a developing means as a processing means, are integrally disposed, and which is removably installable in the main assembly of an image forming apparatus. Further, it includes a cartridge in which an electrophotographic photosensitive drum, a pair of processing means, more specifically, a combination of a charging means, and a developing means or a cleaning means, are integrally disposed, and which is removably installable in the main assembly of an image forming apparatus. By the way, a process cartridge in which an electrophotographic photosensitive drum and a developing means are integrally disposed is generally referred to as a process cartridge of the "integration type", whereas a process cartridge in which an electrophotographic photosensitive drum and processing means other than a developing means are integrally disposed is generally referred to as a process cartridge of the so-called "separation type".

A process cartridge is removably installable in the main assembly of an image forming apparatus by a user himself or herself. Thus, it can simplify the maintenance of the main assembly. By the way, processing means are such means that act on (process) an electrophotographic photosensitive drum.

A development cartridge is such a cartridge that has a development roller, stores developer (toner) to be used for developing an electrostatic latent image formed on an electrophotographic photosensitive drum, with the use of the development roller, and is removably installable in the main assembly of the main assembly of an image forming apparatus. By the way, in the case of an image forming apparatus which employs a development cartridge, its electrophotographic photosensitive drum is attached to the main assembly of the apparatus, or the cartridge supporting member (which will be described later) of the main assembly. Further, in the case of an image forming apparatus which employs a process cartridge of the so-called separation type, its electrophotographic photosensitive drum is a part of the process cartridge (in this case, process cartridge does not have developing means). By the way, a development cartridge also can be installed into, or uninstalled from, the main assembly of an image forming apparatus by a user himself or herself. Thus, it also can simplify the maintenance of the main assembly.

That is, a cartridge includes both a cartridge of the so-called integration type and a cartridge of the so-called separation type. In some cases, a process cartridge of the so-called separation type is used in combination with a development cartridge, and an electrophotographic photosensitive drum is fixed to the main assembly of an image forming apparatus, or the cartridge supporting member (which will be described later) of the main assembly. Further, a cartridge includes a development cartridge which can be removably attached to the cartridge supporting member so that it can act on (process) the electrophotographic photosensitive drum. "Recording medium" is medium on which an image can be formed by an image forming apparatus. It includes a sheet of ordinary paper, OHP film, etc.

There have been known image forming apparatuses (Japanese Laid-open Patent Application No. 2011-70142, for example) provided with a cartridge supporting member, which can removably support multiple cartridges and is movable relative to the main assembly of the image forming apparatus. In a case where an image forming apparatus is structured like these image forming apparatuses mentioned above, as its cartridge supporting member is moved, its exposing member is retracted by the movement of the cartridge supporting member to allow the cartridge supporting member to be moved from its normal position to its cartridge replacement position, so that the cartridges supported together by the cartridge supporting member are exposed from the main assembly, becoming therefore replaceable.

Further, there have been known image forming apparatuses (Japanese Laid-open Patent Application No. 2003-112446, for example) provided with a lid which is pivotally opened or closed about an edge of the top portion of the main assembly, and an LED as an exposing member disposed on the inward side of the lid. An image forming apparatus like these image forming apparatuses is structured so that its process cartridges can be installed into, or uninstalled from, the main assembly of the apparatus, only when the lid is open, and also, so that its LED is enabled to expose the photosensitive drums only when the lid remains closed.

The above-mentioned image forming apparatus disclosed in Japanese Laid-open Patent Application No. 2011-70142 is structured so that in order to replace the cartridges in the main assembly of the apparatus, the exposing member of the main assembly has to be moved out of the cartridge passage, requiring therefore a space into which the exposing member is allowed to retract from the cartridge passage, in the main assembly. Thus, the apparatus main assembly has to be provided with such a space that is necessary only when the cartridges in the main assembly need to be replaced, that is, such a space that is not necessary during an image forming operation. In other words, the apparatus is problematic in terms of the efficiency with which its internal space is utilized, and therefore, is greater in size than it could be.

Further, in the case of the abovementioned image forming apparatus disclosed in Japanese Laid-open Patent Application No. 2003-112446, in order to replace a cartridge (or cartridges) in the image forming apparatus, the abovementioned top lid has to be kept open. Thus, a certain amount of space has to be available on top of the main assembly of the apparatus to allow the lid to be opened. Thus, the image forming apparatus suffers from a problem that a certain amount of space has to be provided on top of the main assembly of the apparatus, at least when the cartridges in the main assembly have to be replaced.

Thus, the primary object of the present invention is to provide an image forming apparatus that is no greater in the size of its main assembly than any conventional image forming apparatus, and yet, requires no space on top of its main assembly when the cartridges in the main assembly are replaced.

SUMMARY OF THE INVENTION

According to an aspect of the present invention, there is provided an image forming apparatus for forming an image on a recording material by forming a toner image on a photosensitive member, comprising a main assembly; a cartridge including said photosensitive member; an endless belt configured to transfer the toner image formed on said photosensitive member; an endless belt supporting member configured to support said endless belt so as to be movable between a contacting position for contacting said endless belt to said photosensitive member and a non-contacting position retracted from the contacting position away from said photosensitive member; and a cartridge supporting member dismountably supporting said cartridge and movable between an image forming position in which said photosensitive member contacts said endless belt taking the contacting position and a non-image-forming position in which said cartridge is movable from a inside of said main assembly to a outside of said main assembly, wherein by movement of said endless belt from the contacting position to the non-contacting position, a space capable of accommodating at least a part of said cartridge supporting member taking the non-image-forming position and/or said cartridge supported by said cartridge supporting member taking the non-image-forming position is provided.

Further features of the present invention will become apparent from the following description of exemplary embodiments with reference to the attached drawings.

DESCRIPTION OF THE EMBODIMENTS

Hereinafter, the present invention is described in detail with reference to a few of the preferred embodiments of the present invention. However, the measurements, materials, and shapes of the structural components of the image forming apparatuses in the following embodiments of the present invention, and their positional relationships, are not intended to limit the present invention in scope. That is, the present invention is also applicable to image forming apparatuses which are different in abovementioned attributes from those in the following embodiment because of the conditions under which they are used.

Embodiment

[General Structure of Image Forming Apparatus]

Figure 1:
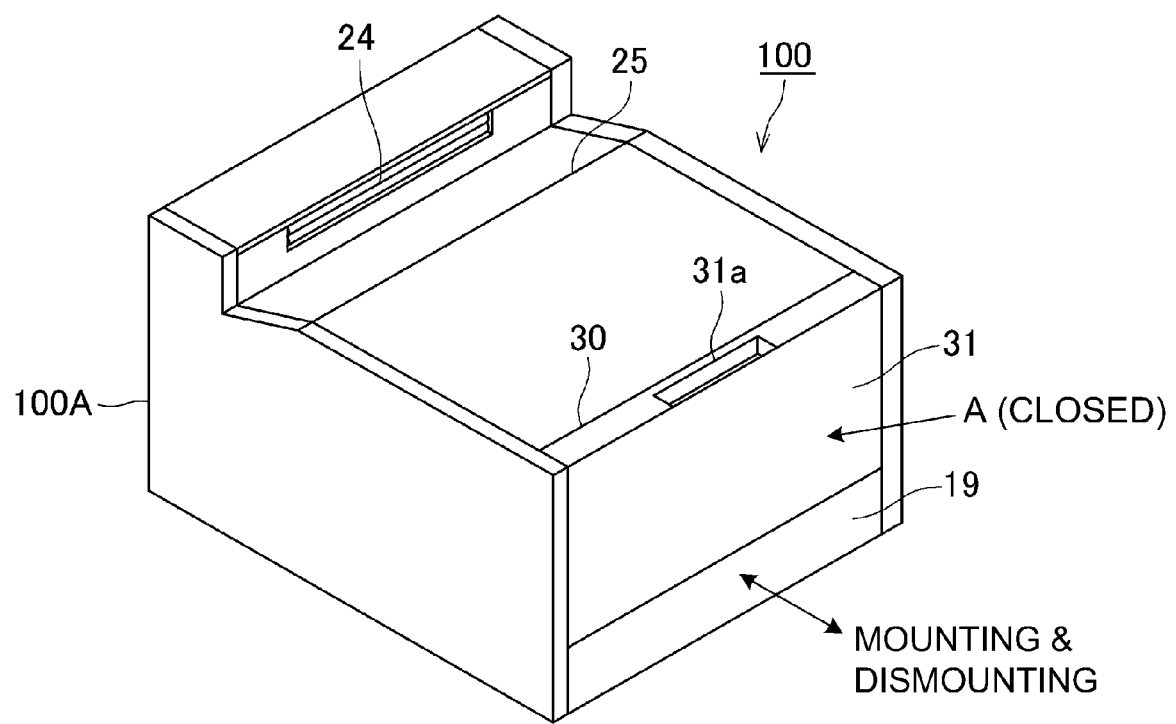
FIG. 1 is an external perspective view of the image forming apparatus in the first embodiment of the present invention.
Figure 2:
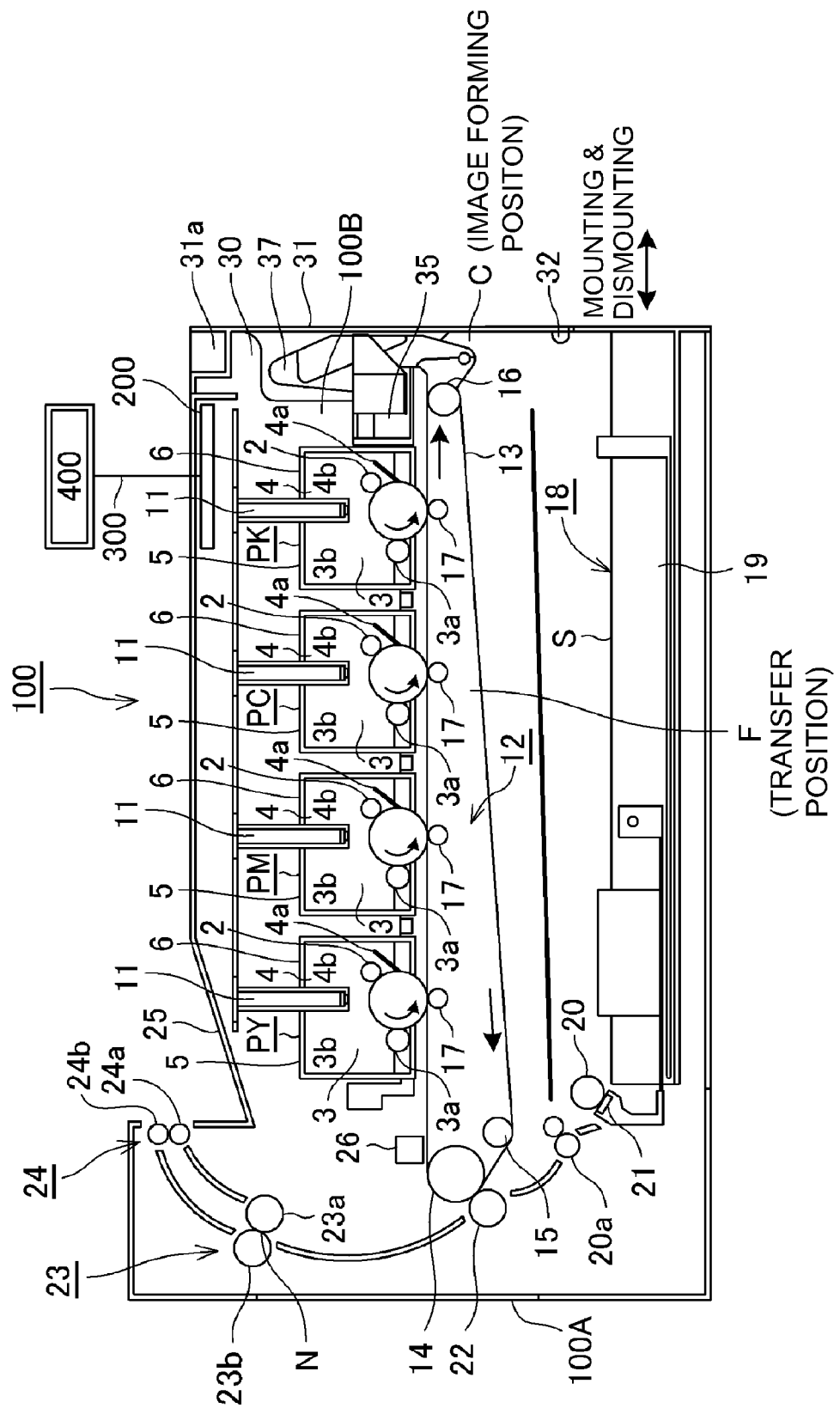
FIG. 2 is a vertical sectional view of the image forming apparatus in the first embodiment, as seen from the left side of the apparatus.

FIG. 1 is an external perspective view of the image forming apparatus 100 in the first embodiment of the present invention. FIG. 2 is a vertical sectional view of the image forming apparatus, as seen from the left side of the apparatus. This image forming apparatus 100 has four cartridges, that is, the first to fourth cartridge P (PY, PM, PC and PK). It is a full-color printer (electrophotographic image forming apparatus) which uses an electrophotographic process. It is based on four primary colors, and uses LEDs.

That is, this image forming apparatus 100 can form a full-color (based on four primary colors) or a monochromatic (black-and-white) image on a sheet S of recording medium, based on electrical image formation signals, which are outputted from an external host apparatus 400 and are inputted into its control portion 200 by way of the interface portion 300. Examples of the external host apparatus 400 are a personal computer, an image reader, a facsimileing machine, etc.

The control portion 200 is a controlling means which controls the electrophotographic image formation process to be carried out by the image forming apparatus 100. It exchanges various electrical information with the external host apparatus 400. Further, it processes the electrical information inputted from various processing devices and sensors, and also, command signals which are to be outputted to the various processing devices. Moreover, it controls a reset initialization sequence, a preset electrophotographic image formation process sequence, etc.

In the following description of the embodiments of the present invention, the front side of the image forming apparatus 100 means the side where the door (main assembly door) of the image forming apparatus 100 is present. The rear side (back side) of the apparatus 100 is the opposite side of the apparatus 100 from the front side. The front-rear direction means the front-to-rear direction (rearward direction) as well as the opposite direction from the front-to-rear direction, that is, the rear-to-front direction (frontward direction). The left and right sides of the image forming apparatus 100 are the left and right sides as the image forming apparatus 100 is seen from the front side. The left-right direction means the right-to-left direction (leftward direction) as well as its opposite direction, that is, the left-to-right direction (rightward direction). Further, the top and bottom sides are the top and bottom sides with reference to the gravity direction. The upward direction means the bottom-to-top direction, whereas the downward direction is the top-to-bottom direction.

Further, the lengthwise direction is such direction that is parallel to the axial line of an electrophotographic photosensitive member which is an image bearing member on which a latent image is formed. The widthwise direction is such direction that is perpendicular to the abovementioned lengthwise direction. Further, one end of the image forming apparatus in terms of the lengthwise direction is the drive side, and the other end is the non-drive side. In this embodiment, the right side, with respect to the lengthwise direction, is the drive side, whereas the left side is the non-drive side.

The main assembly 100A (main assembly frame) of the image forming apparatus 100 is provided with a cartridge storing portion 100B, which is in the apparatus main assembly 100A. It is in this cartridge storing portion 100B that the first to fourth cartridges PY, PM, PC and PK are horizontally installable in their predesignated positions, in the listed order with reference to the rear-to-front direction (inline structure, tandem type). The preset cartridge position in the cartridge storing portion 100B is the position in which the cartridge P can contribute to an image forming operation.

Each of the four cartridges P contributes to a process for forming an image on a sheet S of recording medium. It is removably installed in the apparatus main assembly 100A of the image forming apparatus 100 to be used for an image forming operation. Each cartridge P in this embodiment has an electrophotographic photosensitive member 1 (which hereafter is referred to simply as drum) as a photosensitive member on which a latent image is formed. The electrophotographic photosensitive member is in the form of a drum. Further, each cartridge P is a process cartridge of the so-called integrated type. That is, it has the drum 1, and a combination of a charging means 2, a developing means 3, and a cleaning means, which is an electrophotographic means for processing the drum 1 to form an image.

In this embodiment, the charging means 2 is a charge roller of the contact type. The developing means 3 is a developing device of the contact or non-contact type. It has: a development roller 3a, as a developer bearing member, which develops a latent image into a developer image (image formed of developer) by supplying the drum 1 with developer; and a developer storing portion 3b which stores developer; etc. The cleaning means 4 has a cleaning device of the blade type. It has: a cleaning blade 4a as a cleaning member; a waste toner storing portion 4b; etc. Each cartridge P has its own electrophotographic processing system having image formation processing devices such as those described above. It is different from the others only in the color of the developer (which hereafter is referred to as toner) it stores.

That is, the first cartridge PY stores yellow (Y) toner in its developing device 3. It forms a yellow toner image on the peripheral surface of its drum 1. The second cartridge PM stores magenta (M) toner in its developing device 3. It forms a magenta toner image on the peripheral surface of its drum 1. The third cartridge PC stores cyan (C) toner in its developing device 3. It forms a cyan toner image on the peripheral surface of its drum 1. The fourth cartridge PK stores black (K) toner in its developing device 3. It forms a black toner image on the peripheral surface of its drum 1.

The main assembly 100A of the image forming apparatus 100 is provided with an LED unit 11 as a light emitting member for forming a latent image on the peripheral surface of the drum 1 of each cartridge P, by exposing the peripheral surface of the drum 1. The LED unit 11 is on top of the combination of the cartridges PY, PM, PC and PK, being virtually in contact with the drum 1 through an exposure window 6, with which the top wall of the cartridge frame 5 is provided. It exposes the peripheral surface of the drum 1 of each cartridge by outputting a beam of light while modulating the beam according to the information inputted into the control portion 200 from the external host apparatus 400, regarding each of the four monochromatic images of which the image to be formed was separated.

Further, the apparatus main assembly 100A is provided with an intermediary transfer unit 12 as a transfer unit which transfers (secondary transfer) onto a sheet S of recording medium, the toner image transferred onto its endless belt 13 from the drum 1 of each cartridge P. The intermediary transfer unit 12 is disposed under the combination of the cartridges PY, PM, PC and PK. This unit 12 has: the endless belt 13 as an intermediary transferring member which is formed of dielectric substance and is flexible; and a combination of a driver roller 14, an auxiliary roller 15, and a tension roller 16, by which the belt 13 is suspended, tensioned, and circularly moved. The driver roller 14 and auxiliary roller 15 are disposed on the rear side, in the apparatus main assembly 100A. The tension roller 16 is disposed on the front side, in the apparatus main assembly 100A. The combination of the driver roller 14, auxiliary roller 15, tension roller 16, etc., makes up an endless belt supporting member.

When each cartridge P is in its preset image formation position in the apparatus main assembly 100A, the downwardly facing portion of the peripheral surface of its drum 1 is in contact with the upwardly facing portion of the outward surface of the belt 13. There are four primary transfer rollers 17 on the inward side of the loop (belt loop) which the belt 13 forms. They are disposed so that they oppose the four drums 1 in the four cartridges P, one for one, with the presence of the top portion of the belt 13, with reference to the belt loop.

The area of contact, or the nip, between the drum 1 of each cartridge P, and the belt 13, is one of the primary transfer nips T1. A secondary transfer roller 22 is pressed against the driver roller 14, with the presence of the belt 13 between the two rollers 22 and 14. The nip between the secondary transfer roller 22 and belt 13 is the secondary transfer nip T2.

There is a sheet feeder unit 18 under the intermediary transfer unit 12. The sheet feeder unit 18 stores in layers multiple sheets of recording medium (which hereafter may be referred to simply as recording medium) onto which a toner image is transferred. It feeds the sheet S of recording medium, one by one, to the intermediary transfer unit 12. It has: a sheet feeder tray 19, in which multiple sheets of recording medium are stored in layers; a feed roller 20; a separation pad 21; a pair of registration rollers 20a; etc. The sheet feeder tray 19 can be inserted into, or moved out of, the apparatus main assembly 100A, from the front side of the apparatus main assembly 100A (front loading).

The apparatus main assembly 100A is provided with a fixing apparatus 23, as a fixation unit (fixing means), and a pair of discharge rollers 24, which are in the top side of the rear portion of the apparatus main assembly 100A. The fixing apparatus fixes a toner image to a sheet of recording medium by applying heat and pressure to the sheet S and the toner image thereon, after the transfer of the toner image onto the sheet S, and then, discharges the sheet S. The top wall of the apparatus main assembly 100A is formed so that it can serve as a delivery tray 25. The fixing apparatus 23 has a fixation film assembly 23a and a pressure roller 23b. The pair of discharge rollers 24 is a combination of a discharge roller 24a and a discharge roller 24b.

[Image Forming Operation]

The operation for forming a full-color image is as follows: The four drums 1 in the first to fourth cartridges PY, PM, PC and PK, one for one, are rotationally driven in the counterclockwise direction indicated by arrow marks in FIG. 2, at a preset control velocity, and the belt 13 is circularly driven in the clockwise direction indicated also by arrow marks (so that belt 13 moves in the same direction as peripheral surface of drum 1, in each of the four transfer nips T1).

In synchronism with the driving of the drums 1 and belt 13, the charge roller 2 in each cartridge P uniformly charges the peripheral surface of the corresponding drum 1 to preset polarity and potential level, with the preset control timing, and the LED unit 11 exposes the charged portion of the peripheral surface of each drum 1, in response to the image formation signals which represent the corresponding color.

As a result, an electrostatic latent image which reflects the image formation signals is formed on the peripheral surface of the drum 1 in each cartridge P. Then, the latent image is developed into a toner image (developer image) by the developing device 3. In this embodiment, the LED unit 11 which exposes the drum 1 is disposed in the top portion of the apparatus main assembly 100A. That is, it is disposed on the opposite side of the drum 1 from the belt 13.

Through the above-described electrophotographic image formation process, a yellow toner image, which corresponds to the yellow color components of the full-color image to be formed, is formed on the drum 1 of the first cartridge PY. This toner image is transferred (primary transfer) onto the belt 13, in the primary transfer nip T1 between the cartridge PY and belt 13. On the drum 1 of the second cartridge PM, a magenta (M) toner image, which corresponds to the magenta color component of the full-color image to be formed, is formed. This toner image is transferred (primary transfer) onto the belt 13 in such a manner that it is laid on the yellow toner image on the belt 13, in the primary transfer nip T1 between the cartridge PM and belt 13. On the drum 1 of the third cartridge PC, a cyan (C) toner image, which corresponds to the cyan color component of the full-color image to be formed, is formed. This toner image is transferred (primary transfer) onto the belt 13 in such a manner that it is laid upon a combination of the yellow (Y) and magenta (M) toner images on the belt 13, in the primary transfer nip T1 between the cartridge PC and belt 13. On the drum 1 of the fourth cartridge PK, a black (K) toner image, which corresponds to the black color component of the full-color image to be formed, is formed. This toner image is transferred onto the belt 13 in such a manner that it is laid upon the combination of the yellow (Y), magenta (M) and cyan (C) toner images on the belt 13, in the primary transfer nip T1 between the cartridge PK and belt 13. Consequently, an unfixed full-color toner image is synthetically formed on the belt 13, of the yellow (Y), magenta (M), cyan (C) and black (K) toner images layered on the belt 13. The transfer residual toner remaining on the peripheral surface of the drum 1 in each cartridge P after the primary transfer is removed by the cleaning device 4.

Meanwhile, the feed roller 20 begins to be driven with preset control timing. Thus, the sheets S of recording medium stored in layers in the sheet feeder tray 19 are fed one by one into the apparatus main assembly 100A by the coordination between the feed roller 20 and separation pad 21. Then, each sheet S of recording medium is introduced into the secondary transfer nip T2 with preset control timing by the pair of registration rollers 20a, and then, is conveyed through the secondary transfer nip T2 while remaining pinched between the secondary transfer roller 22 and belt 13. While the sheet S is conveyed through the secondary transfer nip T2, the four toner images, different in color, layered on the belt 13 are transferred together onto the surface of the sheet S as if they are peeled away from the belt 13.

Then, the sheet S of recording medium is separated from the surface of the belt 13, and is introduced into the fixing apparatus 23 through a recording medium conveyance passage. In the fixing apparatus 23, the sheet S and the toner images thereon are heated and pressed in the fixation nip N of the fixing apparatus 23. Consequently, the four toner images, different in color, on the sheet S are fixed to the sheet S while being mixed. Then, the sheet S is moved out of the fixing device 23, and is discharged as a full-color print onto the delivery tray 25 by the pair of discharge rollers 24. The secondary transfer residual, or the toner remaining on the belt 13 after the separation of the sheet S from the belt 13, is removed by the cleaning means 26.

[Method for Replacing Cartridges]

As the first to fourth cartridges PY, PM, PC and PK are used for image formation, the developer in the developing device 3 in each cartridge P is consumed. Eventually, the amount of the developer in the cartridge P reduces to such a level that prevents the cartridge P from forming an image which is high enough in quality to satisfy the user who purchased the cartridge P. At this point, the cartridge P loses its commercial value.

Thus, the image forming apparatus 100 is provided with a means (unshown) for detecting the amount of the developer in each cartridge P, so that the control portion 200 can compare the detected amount of the remaining developer with a threshold value preset for informing, or warning, a user of the remaining length of cartridge life. That is, as the detected amount of the developer in a given cartridge becomes less than the threshold value, a message or a warning regarding the remaining length of the cartridge life is displayed on the display portion (unshown) of the apparatus 100. In other words, as the amount of the developer in a given cartridge falls below the threshold value, the user is prompted to prepare a replacement cartridge, or replace the cartridge, in order to keep the image forming apparatus 100 satisfactory in image quality.

Figure 3:
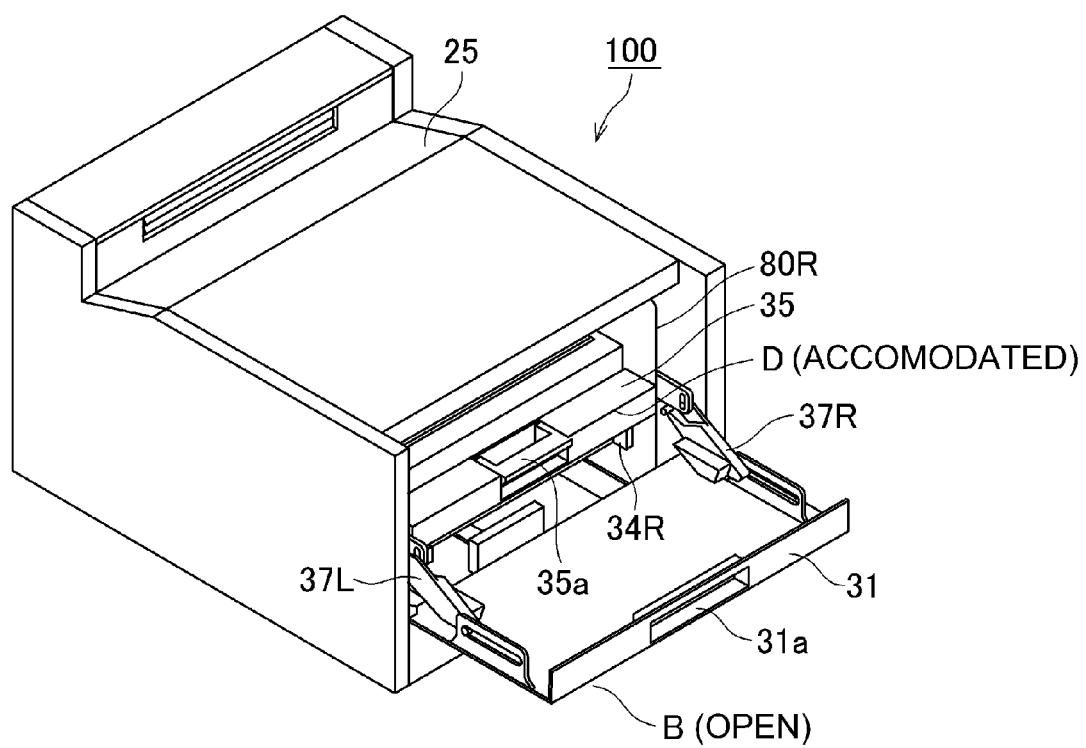
FIG. 3 is an external perspective view of the image forming apparatus in the first embodiment when the door of the apparatus is fully open.
Figure 4:
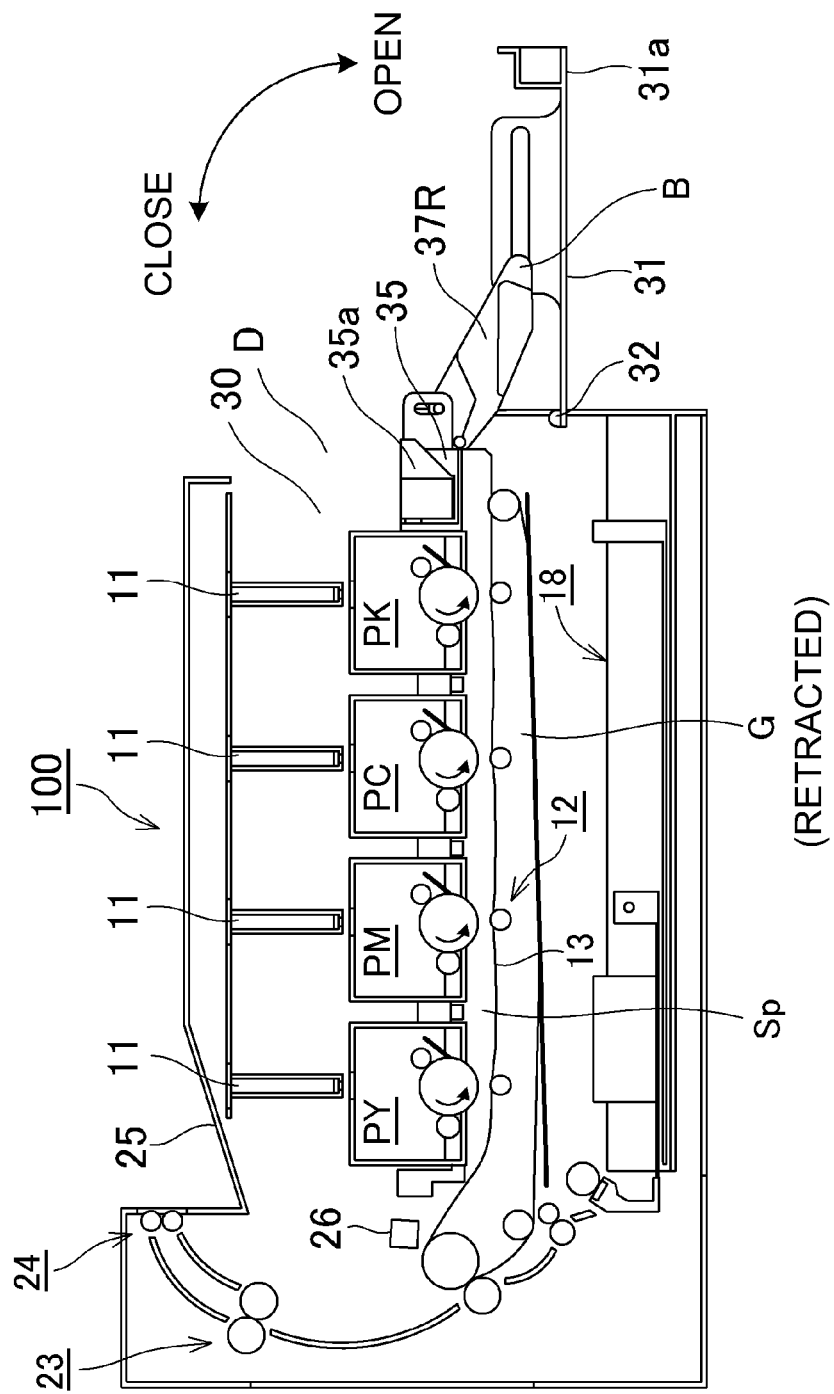
FIG. 4 is a vertical sectional view of the image forming apparatus in FIG. 3, as seen from the left side of the apparatus.

FIG. 3 is an external perspective view of the image forming apparatus 100 when its door is fully open. FIG. 4 is a vertical sectional view of the image forming apparatus 100 as seen from the left side of the apparatus 100. From the standpoint of usability, the image forming apparatus 100 in this embodiment is provided with a cartridge tray 35 (cartridge supporting member), in which the cartridges P are to be mounted, and which can be pulled out of the apparatus main assembly 100A in the frontward direction to replace the cartridges P in the cartridge tray 35 (drawer type; front access type).

More specifically, the front side of the apparatus main assembly 100A is provided with an opening 30, through which the cartridges P can be inserted into, or moved out of, the cartridge storing portion 100B in the apparatus main assembly 100A.

Further, the front side of the apparatus main assembly 100A is provided with a main assembly door 31 (member which can be opened or closed), which can be pivotally moved between an attitude A (closed attitude) in which it covers the opening 30 as shown in FIG. 1, or an attitude B (open attitude) in which it keeps the opening 30 fully exposed as shown in FIGS. 3 and 4. A referential code 31a stands for a recess with which the door 31 is provided to allow a user to grasp the door 31 with his or her fingers. That is, the main assembly door 31 is allowed to assume the attitude A in which it keeps the opening covered, or the attitude B in which it keeps the opening exposed.

In this embodiment, this door 31 can be rotationally (pivotally) opened or closed relative to the apparatus main assembly 100A about the horizontal shaft 32 (hinge shaft) located along the bottom edge of the door 31. That is, the door 31 can pivotally move rearward about the hinge shaft 32 so that it becomes vertical to be shut against the apparatus main assembly 100 as shown in FIG. 1. As this door 31 is closed, the opening 30 is covered. Further, the door 31 can be pivotally moved frontward of the apparatus main assembly 100A about the hinge shaft 32 so that it becomes roughly horizontal to be fully open relative to the apparatus main assembly 100A as shown in FIGS. 3 and 4. As the door 31 is pivotally moved frontward all the way, the opening 30 on the front side of the apparatus main assembly 100A is fully exposed.

Figure 15A:
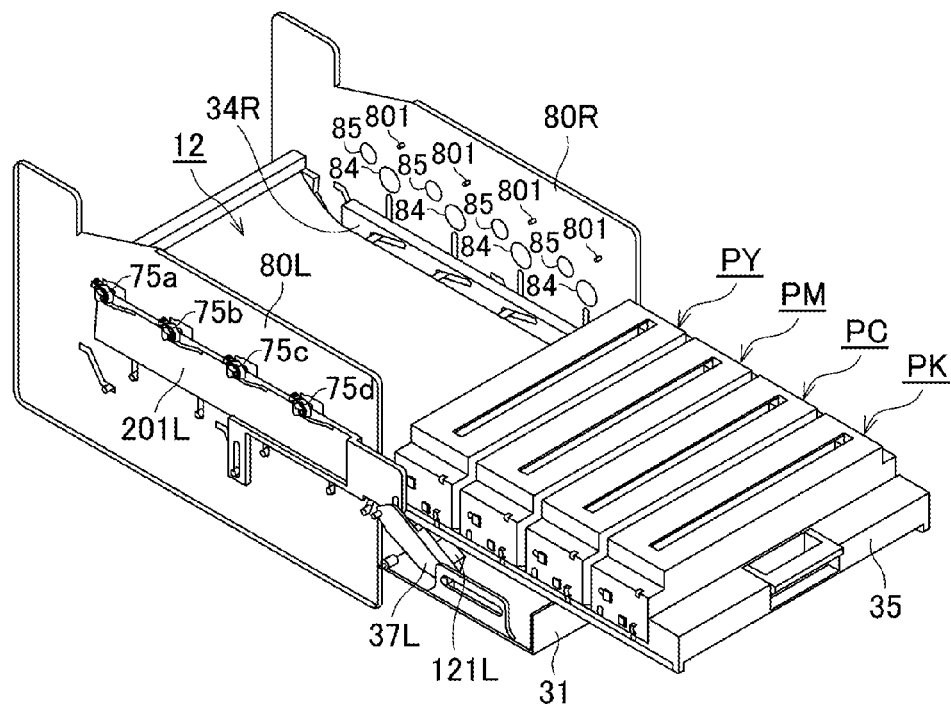
FIGS. 15A, 15B, and 15C illustrate the means for positioning the cartridges, in the first embodiment.
Figure 15B:
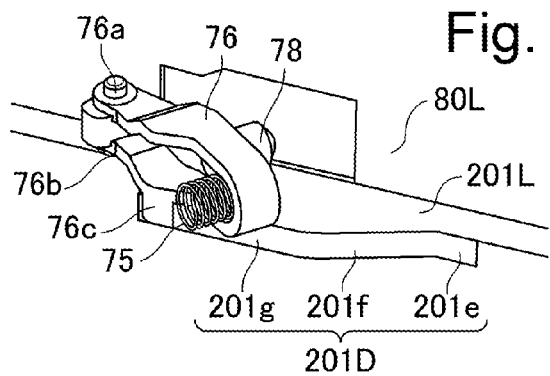
Figure 15C:
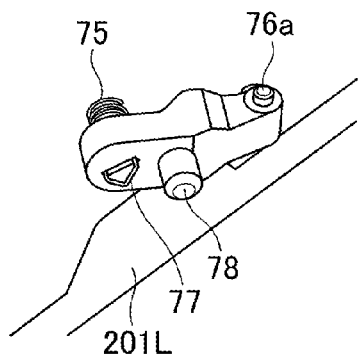
Figure 16A:
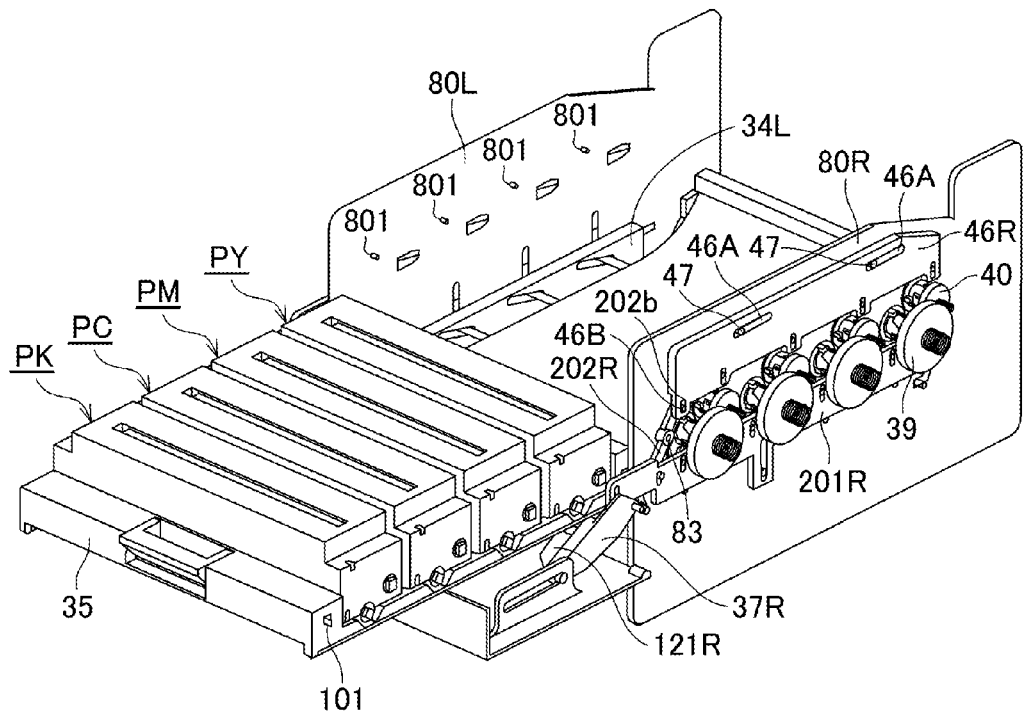
FIGS. 16A, 16B, and 16C illustrate the means for positioning the cartridges, in the first embodiment.
Figures 16B, 16C:
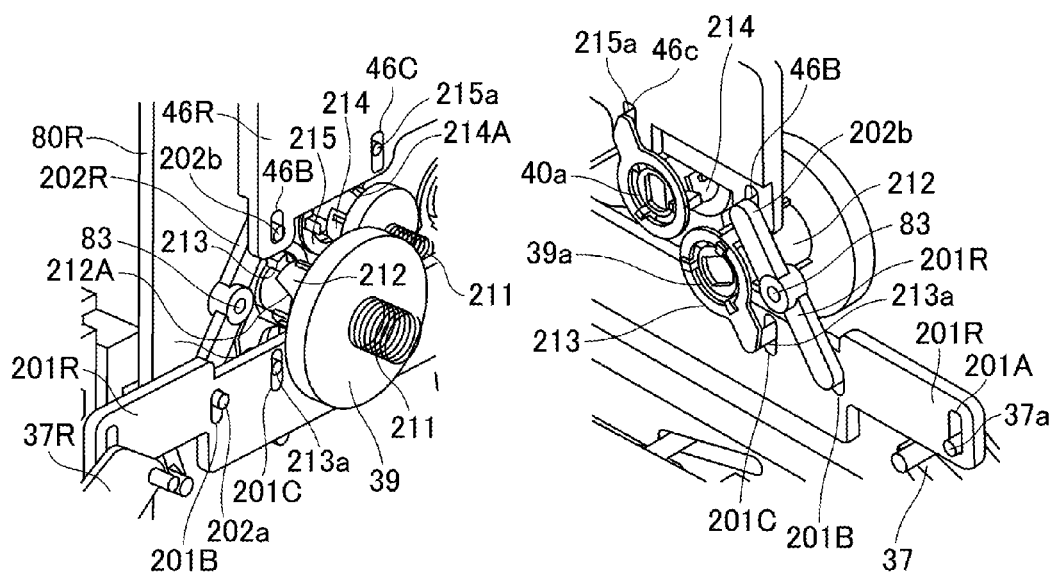

The apparatus main assembly 100A has a main frame (main assembly frame), which has the left and right plates 80L and 80R. Referring to FIGS. 15 and 16, etc., it has also a pair (left and right) tray holding members 34L and 34R, which are on the inward side of the left and right plates 80L and 80R, respectively. The tray holding members 34L and 34R oppose each other across the internal space of the apparatus main assembly 100A. Their lengthwise direction is parallel to the front-rear direction of the apparatus main assembly 100A.

Figure 5:
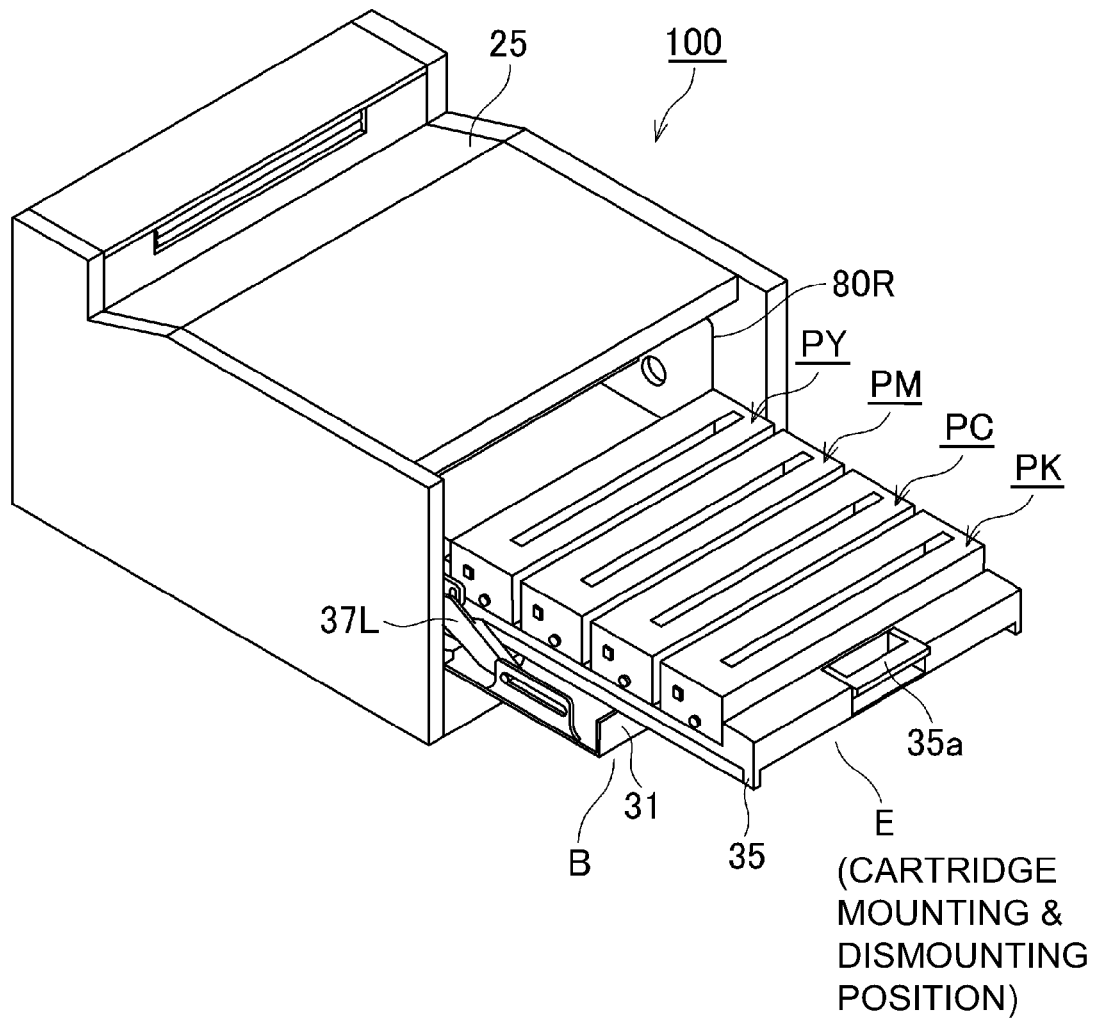
FIG. 5 is an external perspective view of the image forming apparatus in the first embodiment when its cartridge tray is in its outermost position.
Figure 6:
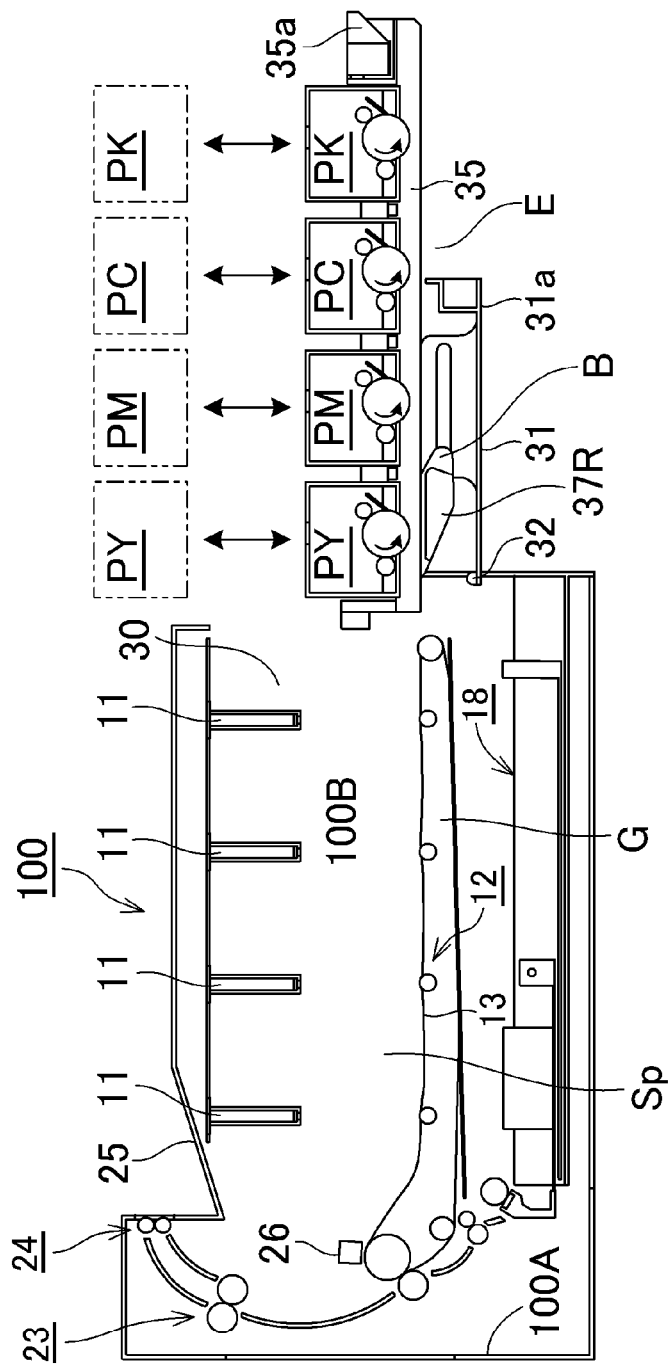
FIG. 6 is a vertical sectional view of the image forming apparatus in the first embodiment, as seen from the left side of the apparatus, when the apparatus in the state shown in FIG. 5.

FIG. 5 is an external perspective view of the image forming apparatus 100 when the tray 35 is in its outermost position relative to the apparatus main assembly 100A. FIG. 6 is a vertical sectional view of the image forming apparatus 100, as seen from the left side of the apparatus, when the tray 35 is in its outermost position relative to the apparatus main assembly 100A. The tray 35 is supported by the tray holding members 34L and 34R (FIGS. 15 and 16) in such a manner that it can slide between a position D, shown in FIG. 4, which is in the apparatus main assembly 100A, and a position E, shown in FIG. 6, which is outside the apparatus main assembly 100A, through the space between the left and right plates 80L and 80R of the main frame. The position D is such a position in the apparatus main assembly 100A that corresponds to the cartridge storing portion 100B. The position E is such a position that is outside the apparatus main assembly 100A and allows a user to mount the cartridges P into the tray 35, or dismount the cartridges P from the tray 35. The cartridges PY, PM, PC and PK are removably mounted in this tray 35, being thereby supported by the tray 35. The tray 35 is such a movable member that can be slid in the direction which is perpendicular (intersectional) to the direction of the axial line of each drum 1 in the tray 35 (lengthwise direction of cartridge P). That is, the direction in which the tray 35 moves between the position D in the apparatus main assembly 100A, and the position E which is outside the apparatus main assembly 100, and allows a user to mount the cartridges P into the tray 35, or remove the cartridges P from the tray 35, is such a direction that is perpendicular to the lengthwise direction of each cartridge P. Further, the tray 35 is structured so that multiple (four in this embodiment) cartridges P can be mounted in parallel, in the tray 35, in terms of the direction parallel to the direction in which the tray 35 is movable between the position D and the position E. That is, the tray 35, which is a movable member, moves while supporting one or more cartridges P. It is movable through the space between the two side plates 80L and 80R, which are parts of the boxy main frame of the apparatus main assembly 100A, and which oppose each other.

When the door 31 is in the attitude A as shown in FIG. 1, the tray 35 is in its image formation position C, and the drums 1 in the four cartridges P are in contact with the belt 13. Thus, the image forming apparatus 100 is ready for an image forming operation, and the cartridges P are precisely positioned relative to the LED unit 11 so that the drums 1 can be exposed by the LED unit 11. Further, when the image forming apparatus 100 is in this state, the intermediary transfer unit 12 is in its transfer position F which positions each cartridge P and belt 13 to be ready for an image forming operation. In this embodiment, the transfer position F for the intermediary transfer unit 12 is such a position that when the intermediary transfer belt 12 is in the position F, the drum 1 in each cartridge P is in contact with the belt 13 of the intermediary transfer unit 12. That is, it is a contact position (FIG. 2).

As the door 31 is pivotally opened, the top portion of the belt 13, with reference to the belt loop, is moved downward, along with the tension roller 16 and primary transfer roller 17, by the movement of the door 31, and the tray holding members 34L and 34R are also moved frontward by a preset amount as well as downward by a preset amount by the movement of the door 31. As the tension roller 16 and primary transfer roller 17 move downward, the top portion of the belt 13 is moved downward by its own weight. Consequently, the top portion of the belt 13 of the intermediary transfer unit 12 moves into its retraction position G shown in FIG. 6. When the top portion of the belt 13 is in this retraction position G, it has retracted from the drums 1 (photosensitive members). That is, it is also a noncontact position. Moreover, as the door 31 is opened, the tray 35, which is supporting the cartridges PY, PM, PC and PK, is moved both frontward and downward from the abovementioned image formation position C, to be moved into its transitional position D in the apparatus main assembly 100A. As the tray 35 is moved as described above, the cartridges P supported by the tray 35 retract from the LED units 11 as shown in FIG. 4, and the drums 1 become separated from the belt 13. When the image forming apparatus 100 is in this state, the transitional position D is also a position (no-image forming position) which is closer to the belt 13 which is in the noncontact position, than the image formation position C. Further, while the intermediary transfer unit 12 moves from the transfer position F to the retraction position G, the belt 13 which is in the contact position moves to the noncontact position, creating thereby an empty space Sp (FIGS. 4 and 6). Even when the tray 35 is in the transitional position D, each cartridge P or a part of the tray 35 (in this embodiment, part of tray 35 and part of cartridge P) can be in the space Sp. The details of the mechanism for causing the movement of the door 31 to move the tray holding member 34L and 34R and intermediary transfer unit 12 will be given later.

As will be described later in detail, as the door 31 is pivotally opened, the positioning pins 78 (part (b) of FIG. 15) which were positioning the cartridges P are retracted by the movement of the door 31, and also, the electrical contacts 55 (FIG. 7) of each cartridge P are disengaged from the power supply system 77 (FIG. 15(C)) of the apparatus main assembly 100A, by the movement of the door 31 (electrical disengagement). Further, the driving force input portions 53 and 54 (FIG. 8) of each cartridge P are disengaged from the driving force output portion 39 and 40 (FIG. 16) of the apparatus main assembly 100A by the movement of the door 31 (mechanical disengagement).

The procedure to move the tray 35 from the transitional position D to the cartridge mounting/dismounting position E by pulling the tray 35 when the image forming apparatus 100 is in the above-described state is as follows: First, a user is to grasp the handhold 35a (tray unlocking means) which is visible through the exposed opening 30 as shown in FIGS. 3 and 4. As the handhold 35a is grasped, the tray 35 is unlocked so that it can be moved frontward.

That is, it becomes possible for the tray 35 to be pulled frontward from the transitional position D in the apparatus main assembly 100A to be moved out of the apparatus main assembly 100A. In other words, it becomes possible for the tray 35 to be horizontally slid (glide) frontward on the tray holding members 34L and 34R. Then, a user is to pull the tray 35 frontward until the tray 35 reaches the cartridge mounting/dismounting position E so that the cartridges P can be mounted into, or dismounted from, the tray 35.

To reiterate, when it is necessary to remove the cartridges P, the tray 35 is to be pulled out of the apparatus main assembly 100A far enough for all of the first to fourth cartridges PY, PM, PC and PK to be moved past the opening 30 so that they are exposed on the top side from the apparatus main assembly 100A. As the tray 35 is moved outward from the transitional position D by a preset amount (sufficiently large amount), it is prevented by unshown stoppers from being moved further outward. Then, the tray 35 is kept roughly horizontal in the preset cartridge mounting/dismounting position E by the tray holding members 34L and 34R (FIG. 10), and a pair of connective arms 37L and 37R (FIGS. 15 and 16), which are described later.

The tray 35 is held in the cartridge mounting/dismounting position E in such a manner that each cartridge P can be dismounted upward. That is, a cartridge P to be replaced, for example, a cartridge which has reached the end of its expected life span, is to be extracted upward from the tray 35 by a user, as indicated by broken lines in FIG. 6, and then, a new cartridge is to be mounted into the tray 35 from the top side of the tray 35 by the user. That is, it is when the tray 35 is in the cartridge mounting/dismounting position E that the cartridges P can be mounted into, or dismounted from, the apparatus main assembly 100A (tray 35).

The image forming apparatus 100 in this embodiment is structured so that the cartridges PY, PM, PC and PK are disposed in the tray 35 in the listed order starting from the upstream end in terms of the direction in which the tray 35 is moved from the transitional position D in the apparatus main assembly 100A to the cartridge mounting/dismounting position E. Thus, the cartridge PK which stores black (K) developer, and is one of the multiple cartridges P which are different in the color of the developer they store, is supported in the most downstream end of the tray 35, in terms of the direction in which the tray 35 is moved from the transitional position D in the apparatus main assembly 100A to the cartridge mounting/dismounting position E.

The cartridge PK is greater in the amount of developer consumption than other cartridges P. Thus, it is greater in the replacement frequency than the other cartridges P. Thus, when it is necessary to mount the cartridge PK into the tray 35, or dismount the cartridge PK from the tray 35, the tray 35 does not need to be moved all the way to the cartridge mounting/dismounting position E, since the cartridge PK is positioned most downstream in the tray 35 in terms of the direction in which the tray 35 is pulled out of the apparatus main assembly 100A. That is, the tray 35 has to be pulled out of the apparatus main assembly 100A only partially. In other words, in the case of this embodiment, attention was paid to make it easier for a user to replace the downstream cartridges P. That is, the image forming apparatus 100 is structured so that as the tray 35 is moved outward from the transitional position D in the apparatus main assembly 100A, to the cartridge mounting/dismounting position E to replace one or more of the four cartridges P in the tray 35, it becomes possible for the cartridges P in the tray 35 to be sequentially removed from the tray 35 starting from the most downstream one in terms of the direction in which the tray 35 is moved outward of the apparatus main assembly 100A, in proportion to the amount by which the tray 35 is moved outward of the apparatus main assembly 100A; when the tray 35 is in the cartridge mounting/dismounting position E, all the cartridges P can be removed from the tray 35.

[Cartridge]

Figure 7:
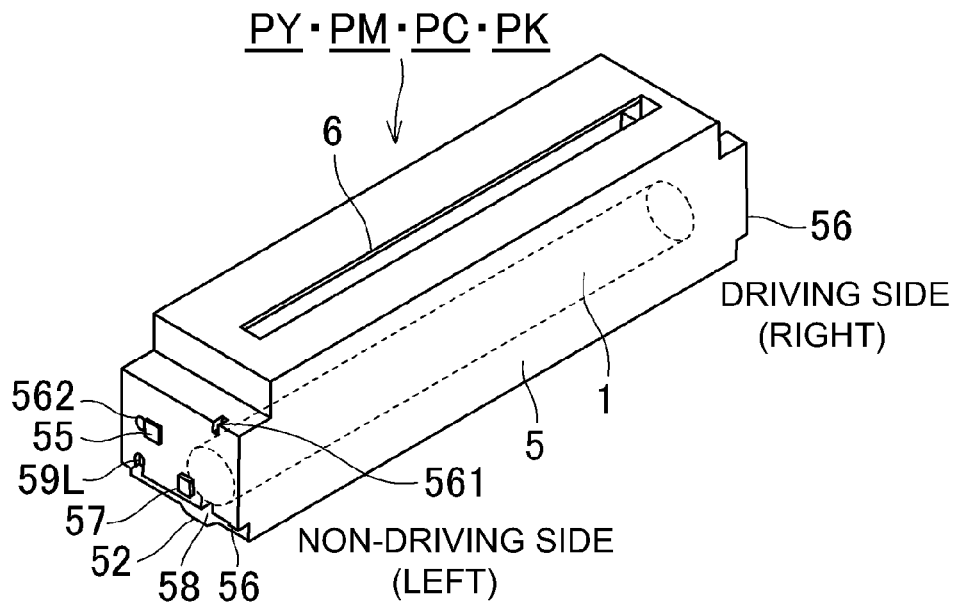
FIG. 7 is a perspective view of the cartridge in the first embodiment, as seen from the non-drive side, or the side from which the cartridge is not driven.
Figure 8:
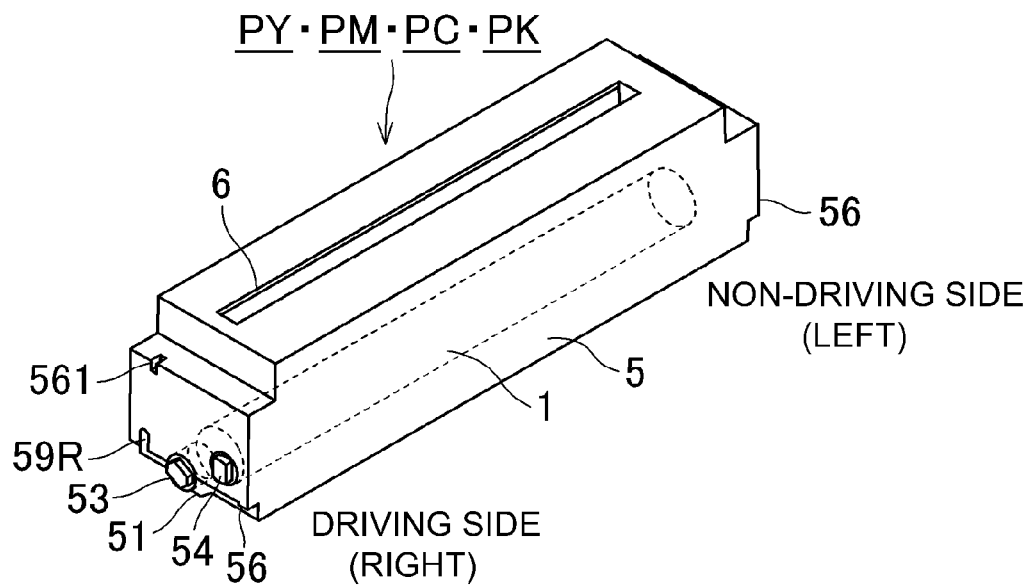
FIG. 8 is a perspective view of the cartridge in the first embodiment, as seen from the drive side, or the side from which the cartridge is driven.

FIGS. 7 and 8 are external perspective views of one of the cartridges P, as seen from the non-drive side, or the side from which the cartridge P is not driven, and the drive side, or the side from which the cartridge P is driven, respectively. Each cartridge P is an assembly of several components, including the drum 1. It is roughly in the form of a rectangular parallelepiped. In this embodiment, the direction which is parallel to the axial line of the drum 1 is referred to as the left-right direction, which is parallel to the lengthwise direction of the cartridge P. The drum 1 is rotatably supported between a pair of bearings 51 and 52, with which the right and left walls of the cartridge frame 5 are provided, respectively. The right bearing 51 is provided with a coupling 53 as a drum driving force input portion (connective portion for inputting drum driving force). Further, the right end of the cartridge P is provided with a coupling 54 as a development roller driving force input portion (connective portion for inputting developing device driving force) for driving the development roller 3a. Moreover, the right end of the cartridge P is provided with a positioning groove 59R for temporarily positioning the cartridge P in terms of the front-rear direction, as the cartridge P is mounted in the tray 35.

As for the left end of the cartridge P, it is provided with a positioning hole 562 for positioning the cartridge P in both the front-rear direction and vertical direction, a positioning projection 57 for positioning the cartridge P in terms of the left-right direction, a positioning groove 59L for temporarily positioning the cartridge P in terms of the front-rear direction, an electrical contact 55 (electrical power supply contact), and a grounding contact 58. Further, each of the left and right ends of the cartridge P is provided with a protrusive portion 56, which protrudes in the leftward and rightward directions, respectively. Further, each of the left and right ends of the cartridge P is provided with a rotation prevention groove 561. Moreover, the top wall of the cartridge frame 5 is provided with an exposure window 6, which extends in the lengthwise direction.

In the case of the cartridge P described above, its right end, which is provided with the couplings 53 and 54, is the drive side, whereas its left end, that is, the opposite end from the right end, which is provided with the electrical contact 55, is the non-drive side. That is, one (right) end of the cartridge P in terms of the direction which is perpendicular to the direction in which the tray 35 is moved between its cartridge mounting/dismounting position E, and the transitional position D in the apparatus main assembly 100A, has the driving force transmitting connective portions 53 and 54. The other end (left end) has the power supply contact 55.

[Tray]

Figure 9:
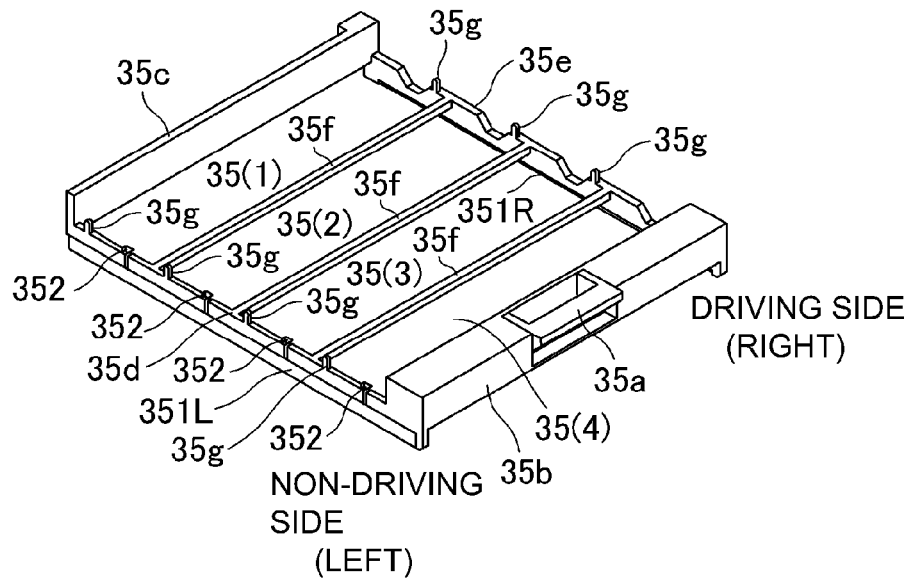
FIG. 9 is a perspective view of the cartridge tray in the first embodiment.

FIG. 9 is an external perspective view of the tray 35. This tray 35 has a rectangular main frame, which has four cartridge chambers formed by partitioning the internal space of the main frame with three partitioning plates 35f. The four chambers are rectangular and are roughly equal in size. Their lengthwise direction is perpendicular to the front-rear direction. They are referred to as the first to fourth sections 35(1)-35(4), listing from the rear wall 35c side. The first to fourth sections 35(1)-35(4) are where the first to fourth cartridges PY, PM, PC and PK are held, respectively.

The tray 35 and cartridges P are structured as follows: Each cartridge P is to be inserted into the corresponding section of the tray 35 from above. As it is inserted, the positioning protrusions 35g of the tray 35, which are for temporarily positioning the cartridge P, fit into the positioning grooves 59L and 59R of the cartridge P, which are for temporarily positioning the cartridge P. Thus, the cartridge P is guided by the protrusions 35g. Further, the bottom surface of the left protrusive portions 56 of the cartridge P, and that of the right protrusive portion 56 of the cartridge P, are supported by the top surface of the left portion 35d of the main frame of the tray 35, and that of the right portion 35e of the right portion of the main frame of the tray 35, respectively. Further, as the cartridge P is inserted into the tray 35, the ground contact 35 of the cartridge P, which is for grounding the drum 1, comes into contact with the grounding contact 352 of the tray 35, establishing electrical connection between the drum 1 and apparatus main assembly 100A. The bottom surface of the left portion 35d of the main frame of the tray 35, and the bottom surface of the right portion of the main frame of the tray 35, are supported by the tray supporting members 34L and 34R of the left and right sides of the apparatus main assembly 100A, by being rested on the top surface of the tray supporting member 34L and the top surface of the tray supporting member 34R, respectively. Thus, not only is the tray 35 supported between the left and right portions 80L and 80R of the main frame of the apparatus main assembly 100A, but also, it is allowed to horizontally slide on the top surface of the tray supporting member 34L (supporting base), and the top surface of the tray supporting member 34R (supporting base), in the front-rear direction.

If a given cartridge P among the cartridges P in the tray 35 needs to be replaced, the tray 35 is to be pulled out to the cartridge mounting/dismounting position E, as shown in FIGS. 5 and 6, and then, the cartridge P to be replaced is replaced. After the replacement of the cartridge P, the tray 35 is to be pushed back into the apparatus main assembly 100A to put the image forming apparatus 100 back into the state in which the apparatus 100 was, as shown in FIGS. 3 and 4, before the tray 35 was pulled out of the apparatus main assembly 100A.

As the tray 35 is pushed back into the apparatus main assembly 100A, to a preset position, the spring-loaded tray locking claw 101 (movement regulating means) (FIG. 16) of the tray 35 engages with the unshown catch of the apparatus main assembly 100A (engaging portion of main assembly). Thus, the tray 35 is locked into the transitional position D in the apparatus main assembly 100A.

Then, the open door 31 is to be closed as shown in FIG. 1. As the door 31 is closed, the image forming apparatus 100 becomes ready for an image forming operation. That is, as the door 31 is pivotally moved to be changed in attitude from the attitude B (open) to the attitude A (closed), the intermediary transfer unit 12 is upwardly moved from its retraction position G to its transfer position F by the movement of the door 31. At the same time, the tray holding members 34L and 34R are moved rearward as well as upward, by a preset amount. As the tray holding members 34L and 34R are moved rearward as well as upward, the tray 35 is moved from the transitional position D in the apparatus main assembly 100A to the image forming position C by the movement of the tray holding members 34L and 34R.

Further, the driving force output portions 39 and 40 of the apparatus main assembly 100A are engaged with the driving force input portions 53 and 54 of each cartridges P by the pivotal closing movement of the door 31, and the drive side of each cartridge P is positioned by the driving force output portions 39 and 40 of the apparatus main assembly 100A relative to the apparatus main assembly 100A with respect to the front-rear direction and vertical direction. At the same time, each cartridge P is moved toward its non-drive side (left side) by the pressure applied to the cartridge P from the driving force output portions 39 and 40 of the apparatus main assembly 100A. Consequently, the positioning protrusion 57 for positioning the cartridge P with respect to the left-right direction comes into contact with the left portion 80L of the main frame of the apparatus main assembly 100A, positioning thereby the cartridge P with respect to the left-right direction.

As for the non-drive end of the cartridge P, a positioning pin 78 for fixing the cartridge P in position fits into a positioning hole 562, whereby the cartridge P is fixed in position relative to the apparatus main assembly 100A with respect to the front-rear direction as well as the vertical direction. Further, the power supply system 77 of the apparatus main assembly 100A comes into contact with the electrical contact 55 of the cartridge P, establishing thereby electrical connection between the apparatus main assembly 100A and cartridge P. The sequential movements of the other members of the cartridge P and apparatus main assembly 100A, which are caused by the pivotal closing movement of the door 31 are described later.

[Mechanism for Causing Door Movement to Move Tray Holding Members]

Next, referring to FIGS. 10-16, the mechanism for causing the movement of the door 31 to move the tray holding members 34L and 34R is described.

Figure 10:
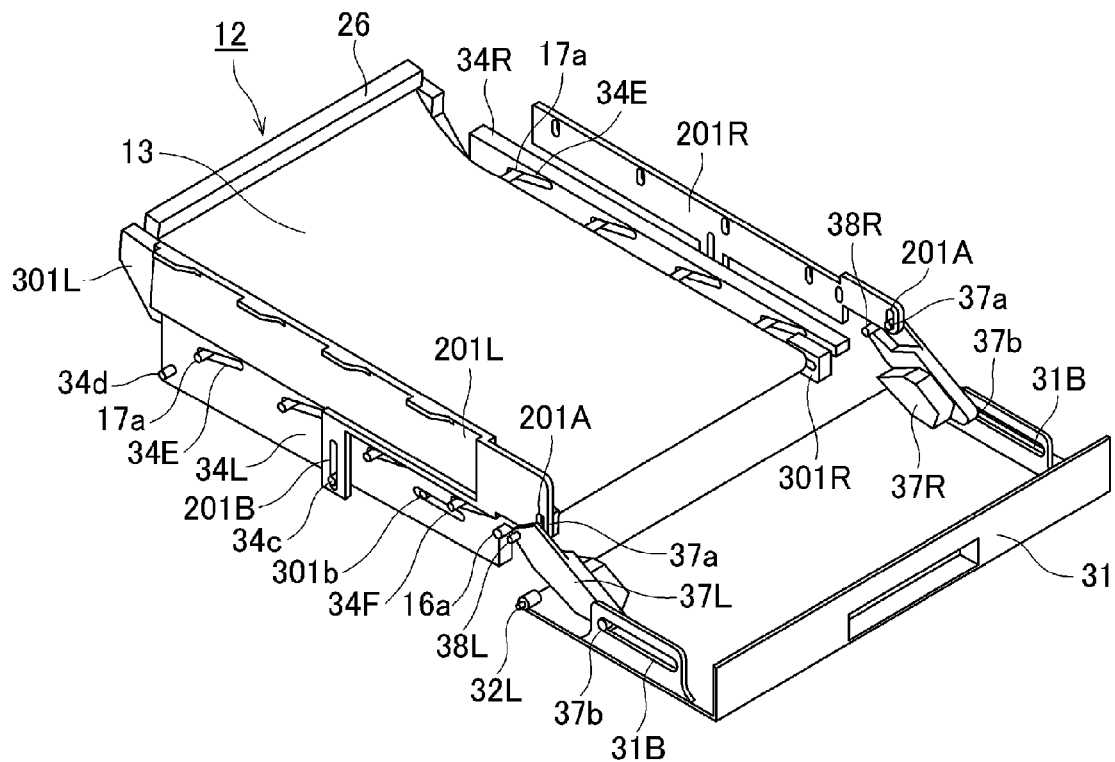
FIG. 10 is a perspective view of a combination of the door, tray holding member, belt unit frame, and mechanism for moving the tray holding member and belt unit frame by the movement of the door.

FIG. 10 is a perspective view of the mechanism for causing the movement of the door 31 to move the tray holding members 34L and 34R and intermediary transfer unit 12. For the sake of convenience, the tray 35 and the left and right plates 80L and 80R are not shown in FIG. 10. The hinges 32L and 32R of the door 31 are attached to the door 31 in such a manner that they are in alignment with each other, and also, that as the door 31 (hinges) is attached to the apparatus main assembly 100A, they become horizontal. The end portion of the left hinge 32L and the end portion of the right hinge 32R are rotatably borne by unshown bearings, with which the left and right plates of the apparatus main assembly 100A are provided, respectively. By the way, the bearings may be a part of the left plate 80L of the apparatus main assembly 100A, and a part of the right plate 80R of the apparatus main assembly 100A (FIG. 15), one for one.

The apparatus main assembly 100A is provided with the pair of connective arms 37L and 37R, which are positioned next to the left and right edges of the door 31, respectively. The connective arms 37L and 37R are provided with hinges 38L and 38R, which are in alignment with each other, and which perpendicularly and outwardly protrude from the left and right connective arms 37L and 37R, respectively, so that as they are attached to the apparatus main assembly 100A, they become horizontal. The hinges 38L and 38R are rotatably supported by an unshown pair of bearings with which the left and right plates 80L and 80R of the apparatus main assembly 100A is provided. The bearings may be the left and right portions 80L and 80R themselves (FIG. 15).

Further, the apparatus main assembly 100A is provided with a pair (left and right) of connective rods 201L and 201R, which are disposed on the outward side of the left plate 80L (FIG. 15) and the outward side of the right plate 80R (FIG. 16), respectively. The connective rods 201L and 201R are supported by unshown guiding members, with which the left and right sides of the apparatus main assembly 100A are provided, so that they are allowed to move only in the front-rear direction.

The connective arms 37L and 37R are provided with horizontal shafts 37a and 37b, respectively. The left end portion of the horizontal shaft 37a of the left connective arm 37L is fitted in a vertically elongated hole 201A, with which the front end portion of the left connective rod 201L is provided. The horizontal shaft 37a of the right connective arm 37R is fitted in a vertically elongated hole 201A, with which the front portion of the right connective rod 201R is provided. The horizontal shaft 37b is fitted in a groove with which the right edge portion of the door 31 is provided.

Further, each of the left and right tray holding members 34L and 34R is provided with a pair of pins (shafts) 34c and 34d, which are fitted in a pair of guiding holes 36 (FIG. 12), with which the left plate 80L (or right plate 80R) of the main frame of the apparatus main assembly 100A is provided. With these pins 34c and 34d being fitted in the guiding holes 36, the tray supporting members 34L and 34R are supported by the left and right plates 80L and 80R, respectively.

The pin 34c of the left tray holding member 34L is put through the guiding hole 36, and is fitted in the vertically elongated hole 201B with which the connective rod 201L is provided. Although the right tray holding member 34R is unillustrated, its pin 34c is put through the guiding hole 36, and is fitted in the vertically elongated hole 201B, with which the right connective rod 201R is provided.

As described above, the door 31 is in connection to the tray holding members 34L and 34R through the combination of the connective arms 37L and 37R and connective rods 201L and 201R, respectively. Thus, as the door 31 is opened or closed, force is applied to the left and right tray holding members 34L and 34R not only in the front-rear direction, but also, in the upward-downward direction. By the way, the mechanism may be structured so that the hinges 38L and 38R of the connective arms 37L and 37R align with the hinges 32L and 32R of the door 31. Moreover, instead of providing the mechanism with the connective arms 37L and 37R, the door 31 may be directly connected to the connective rods 201L and 201R.

Figure 11:
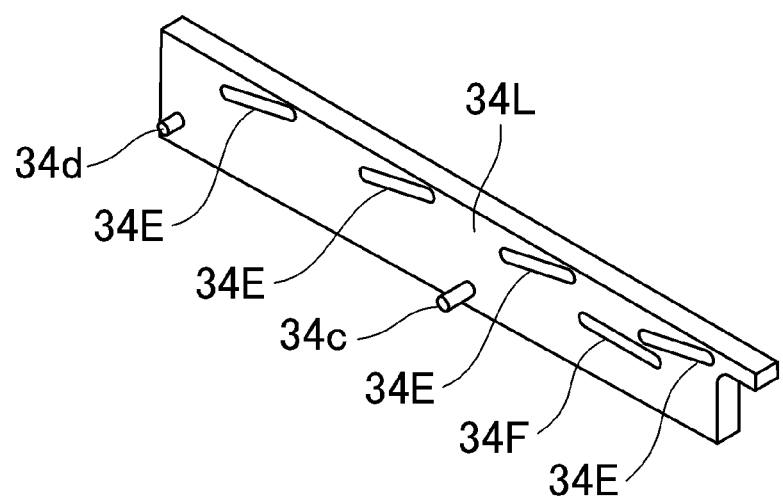
FIG. 11 is a perspective view of one (left) of the tray holding members in the first embodiment.
Figure 12A:
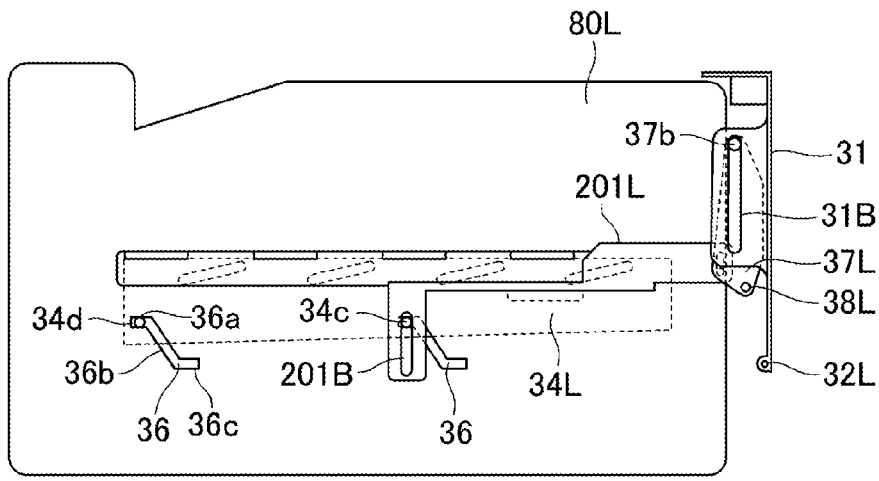
FIGS. 12A, 12B, and 12C illustrate the rotational movement of the door, and the movement of the tray holding member caused by the movement of the door, in the first embodiment.
Figure 12B:
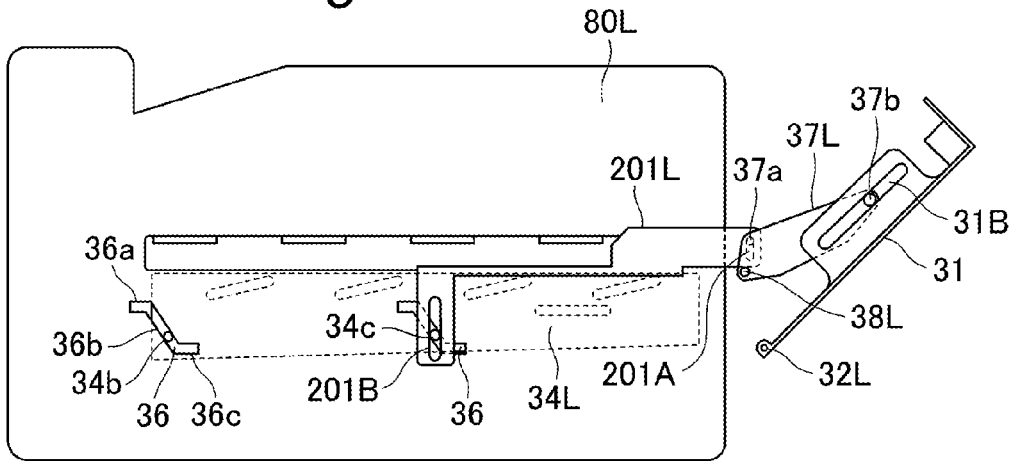

FIG. 11 is a perspective view of the left tray holding member 34L. FIG. 12 is a drawing for describing how the tray holding member 34L is moved by the pivotal movement of the door 31. Regarding the left tray holding member 34L, FIG. 12 shows only the two pins 34c and 34d, and guiding hole 36. Although the right tray holding member 34R is not shown in FIG. 12, it is similar to the left tray holding member 34L. It is structured so that its pins 34c and 34d, and guiding holes 36, are symmetrically positioned relative to the counterparts of the left tray holding member 34L after the apparatus main assembly 100A is assembled. Thus, the left and right tray holding members 34L and 34R are afforded a certain amount of latitude, within the guiding range of the guiding holes 36, with respect to its movement relative to the left and right plates 80L and 80R, respectively. Each guiding hole 36 has the first guiding portion 36a, which horizontally extends in the front-rear direction, and the second guiding portion 36b, which extends diagonally (both frontward and downward) from the front end of the first guiding portion 36a. Further, it has the third guiding portion 36c, which horizontally extends frontward from the bottom end of the second guiding portion 36b, and in which the pins 34c and 34d are fitted so that they are securely held.

As the door 31 is opened, the left and right tray holding members 34L and 34R, which have the pair of pins 34c and 34d, are moved by the movement of the door 31 as is described next. That is, first, they are horizontally moved by the first guiding portion 36a, and then, are moved diagonally downward by the second guiding portion 36b. Lastly, they are horizontally moved by the third guiding portion 36c.

Part (a) of FIG. 12 shows the image forming apparatus 100 when the door 31 is in the closed attitude A, that is, the attitude in which the door 31 is completely shut against the apparatus main assembly 100A, and therefore, the opening 30 is completely covered by the door 31. When the image forming apparatus 100 is in the state shown in part (a) of FIG. 12, the left and right tray holding members 34L and 34R are kept in the rear portion of the apparatus main assembly 100A by the connective arms 37L and 38R and connective rods 201L and 201R, respectively. That is, the pins 34c and 34d are at the rear ends of the first guiding portions 36a of the guiding holes 36. Thus, the left and right tray holding members 34L and 34R are held in preset position (second position) relative to the left and right plates 80L and 80R, respectively. Therefore, the tray 35 held by the tray holding members 34L and 34R is also held in the preset position, that is, the image formation position C (FIG. 2).

Since the tray 35 is held in the image formation position C, the cartridges PY, PM, PC and PK in the tray 35 are in their image formation position in the cartridge chamber 100B, in which they can form an image. The driving force input portions 53 and 54 of each cartridge P are in connection to the driving force output portions 39 and 40 of the apparatus main assembly 100A, respectively. Further, each cartridge P remains precisely positioned by the driving force output portion 39 of the apparatus main assembly 100A, relative to the apparatus main assembly 100A, with respect to both the front-rear direction and vertical direction. Further, each cartridge P will have been pressed toward the non-drive side by being pressed by the driving force output portions 39 and 40, whereby the positioning protrusions 58 for positioning the cartridge P with respect to the left-right direction will have come into contact with the left plate 80L. Thus, the cartridge P is precisely positioned relative to the apparatus main assembly 100A. Further, the positioning pin 78 (FIG. 15) is in the positioning hole 562, and therefore, the non-drive end of the cartridge P is precisely positioned relative to the apparatus main assembly 100A with respect to both the front-rear direction and vertical direction. Further, the rotation prevention pins 801 (FIGS. 15 and 16), with which the side plates 80 are provided are fitted in the rotation prevention grooves 561 (FIGS. 7 and 8), preventing thereby the cartridge P from rotationally moving about the axial line of the bearings 51 and 52. That is, each cartridge P remains precisely positioned relative to the apparatus main assembly 100A.

When the door 31 is remaining completely closed, the downwardly facing portion of the peripheral surface of the drum 1 in each cartridge P remains in contact with the top portion of the outward surface of the belt 13 of the intermediary transfer unit 12. Further, the couplings 53 and 54 (FIG. 18) of each cartridge P are in engagement with the drum driving coupling 39 (FIG. 16) and development roller driving coupling of the apparatus main assembly 100A, respectively; the latter is fitted in the former. Further, the electrical contact 55 (FIG. 7) of each cartridge P is in the state in which it is supplied with electric power by the apparatus main assembly 100A.

Part (b) of FIG. 12 shows the image forming apparatus 100 when the door 31 is halfway open. As the door 31 is opened while it is remaining closed as shown in part (a) of FIG. 12, the left and right tray holding members 34L and 34R are moved frontward in the apparatus main assembly 100A, by the movement of the door 31. Thus, first, the tray holding members 34L and 34R moves frontward, with its pins 34c and 34d being guided by the first portion 36a of the guiding hole 36. As the tray holding members 34L and 34R move frontward, first, the electrical connection between the electrical contact 55 (FIG. 7) of each cartridge P and the apparatus main assembly 100A is dissolved. Then, the drum driving coupling 39 (FIG. 16) and development roller coupling 40 (FIG. 16) of the apparatus main assembly 100A are disengaged from each cartridge P. As for the tray 35, its springy claw 101 (FIG. 16) remains in engagement with the unshown catch of the apparatus main assembly 100A. Thus, it is prevented from being moved frontward by the frontward movement of the tray holding members 34L and 34R.

As the door 31 is opened further, the tray holding members 34L and 34R are pulled frontward by the movement of the door 31, in the apparatus main assembly 100A. Thus, the tray holding members 34L and 34R moves diagonally downward, with its pins 34c and 34d being guided by the second guiding portion 36b of the guiding hole 36. During this movement of the tray holding members 34L and 34R, the tray 35 remains fixed in position with respect to the front-rear direction, and therefore, it does not occur that the tray 35 horizontally moves. That is, the tray 35 follows the vertical movement of the tray holding members 34L and 34R. Part (b) of FIG. 12 shows the state of the image forming apparatus 100, in which the tray 35 is following the vertical movement of the tray holding members 34L and 34R. That is, the tray 35 and the cartridges P in the tray 35 move into the space Sp created by the change in the shape of the belt 13 (belt loop), which is described later. Consequently, each cartridge P separates from the LED unit 11, and each drum 1 separates from the belt 13 of the intermediary transfer unit 12.

Figure 12C:
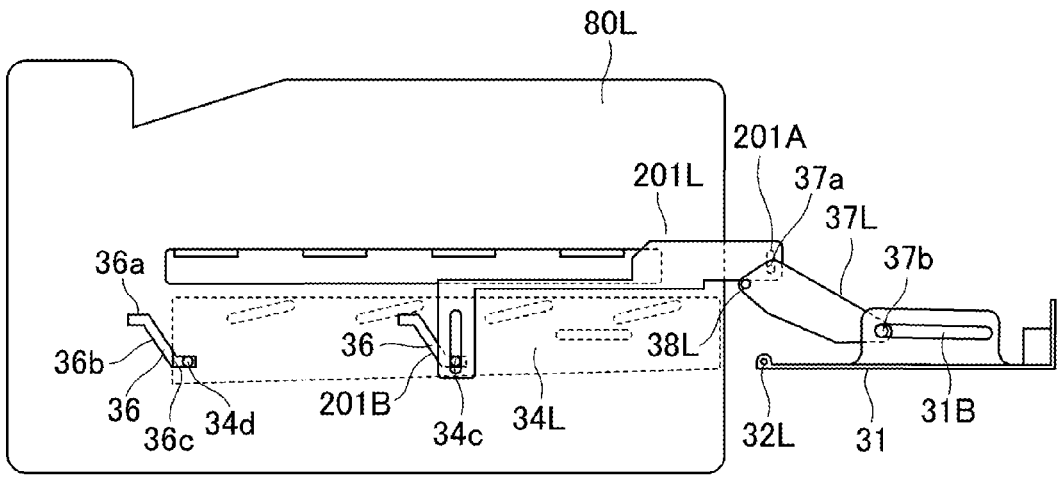

FIG. 12(C) shows the state of the image forming apparatus 100, in which the door 31 is completely open, that is, the opening 30 is completely exposed. When the door 31 is in the state shown in FIG. 12(C), the tray holding members 34L and 34R have finished their diagonally downward movement caused by the second portion 36b of the guiding hole 36, and the pins 34c and 34d are in the third portions 36c of the guiding holes 36. That is, the tray holding members 34L and 34R move diagonally downward, and then, move horizontally again. This structural arrangement is for stabilizing the cartridges P, along with the tray 35, in position, with respect to the vertical direction when the cartridges P are replaced after the tray 35 is pulled out of the apparatus main assembly 100A.

As described above, the tray holding members 34L and 34R are horizontally moved after being moved diagonally downward, whereby they are held in a preset position (first position) relative to the left and right plate 80L and 80R. Thus, the tray 35 held by the tray holding members 34L and 34R is changed in position from the image formation position C (FIG. 2) to the preset position (first position), that is, is, the transitional position D (FIG. 4), and then, is held in the preset position. When the image forming apparatus 100 is in this state, the tray 35 has been unlocked from the apparatus main assembly 100A, being therefore allowed to horizontally slide relative to the tray holding members 34L and 34R. At this point, each cartridge P has moved away from the LED unit 11. Thus, it is allowed to move relative to the LED unit 11 in the front-rear direction. That is, the tray 35 can be moved (slid) between the cartridge mounting/dismounting position E, in which the cartridges P in the tray 35 can be replaced, and the transitional position D from which the cartridges P are installed into the apparatus main assembly 100A.

FIGS. 15 and 16 are perspective views of a combination of the left and right plates 80L and 80R, cartridge tray 35, cartridges P, etc., when the tray 35 is in the cartridge mounting/dismounting position E, in which the cartridges P in the tray 35 are replaceable. When the combination is in the state shown in FIGS. 15 and 16, the tray 35 is in the outermost position relative to the apparatus main assembly 100A, and the rear and front end portions of the tray 35 are supported by the tray holding members 34L and 34R, and the tray supporting portions 121L and 121R of the connective arms 37L and 37R, respectively. Thus, the tray 35 is prevented from being deformed by the weight of the cartridges P in such a manner that its front portion substantially droops. Therefore, it is prevented that the peripheral surface of the drum 1 is damaged by the drooping of the tray 35.

The connective arms 37L and 37R are rotationally moved by the movement of the door 31. Thus, it is possible to structure the apparatus main assembly 100A so that when the door 31 is closed, the supporting portions 121L and 121R of the connective arms 37L and 37R are in the apparatus main assembly 100A, whereas when the door 31 is open, they are outside the apparatus main assembly 100A. With the employment of this structural arrangement, it is possible to reliably hold the tray 35 in the cartridge mounting/dismounting position to improve the image forming apparatus 100 in the usability related to the replacement of cartridges.

The shape of the supporting portions 121L and 121R which support the tray 35 when the tray 35 is in the cartridge mounting/dismounting position, and the number of points at which the supporting portions 121L and 121R are supported, do not need to be those shown in FIGS. 15 and 16. Further, the tray supporting portion (portion which supports tray 35 when tray 35 is out of apparatus main assembly 100A) may be formed as an integral part of the door 31.

Up to this point, the sequence in which the closed door 31 is opened, and the tray 35 in the apparatus main assembly 100A is pulled out of the apparatus main assembly 100A to make it possible for the cartridges P to be extracted from the tray 35, was described. What is caused by the mechanism for moving the tray 35 by the movement of the door 31 as the open door 31 is closed is the opposite of the above-described sequence. That is, as the open door 31 is closed, the tray 31 is moved from outside the apparatus main assembly 100A, into its image formation position C in the apparatus main assembly 100A, by way of the transitional position (no-image-formation position) in the apparatus main assembly 100A.

In the case of this structural arrangement, a combination of the connective arms 37L and 37R, connective rods 201L and 201R, left and right plates 80L and 80R, and tray holding members 34L and 34R makes up the means for changing the cartridges in position. That is, as the door 31 is opened, the tray 35 is moved from the image forming position to the no-image-formation position by the opening movement of the door 31, whereas as the door 31 is closed, the tray 35 is moved from the no-image-formation position to the image formation position by the closing movement of the door 31.

[Mechanism for Moving Intermediary Transfer Unit by Door Movement]

Next, referring to FIGS. 10-16, the mechanism for moving the intermediary transfer unit 12 by the movement of the door 31 is described.

Figure 13A:
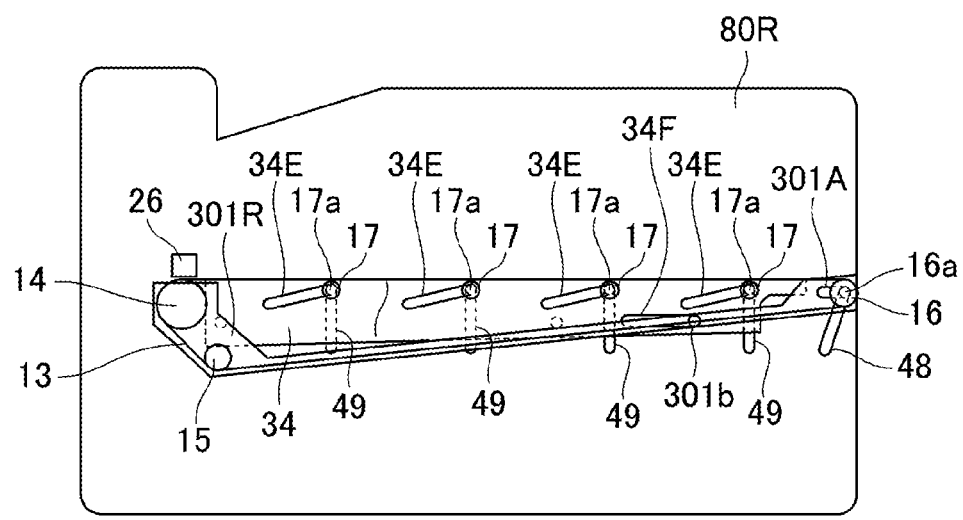
FIGS. 13A, 13B, and 13C illustrate the rotational movement of the door, and the movement of the intermediary transfer unit caused by the movement of the door, in the first embodiment.
Figure 13B:
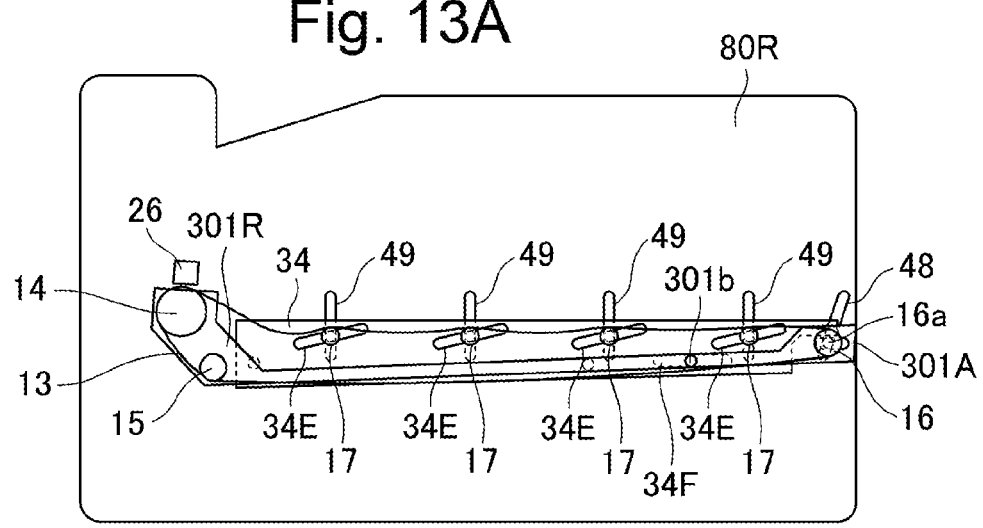
Figure 13C:
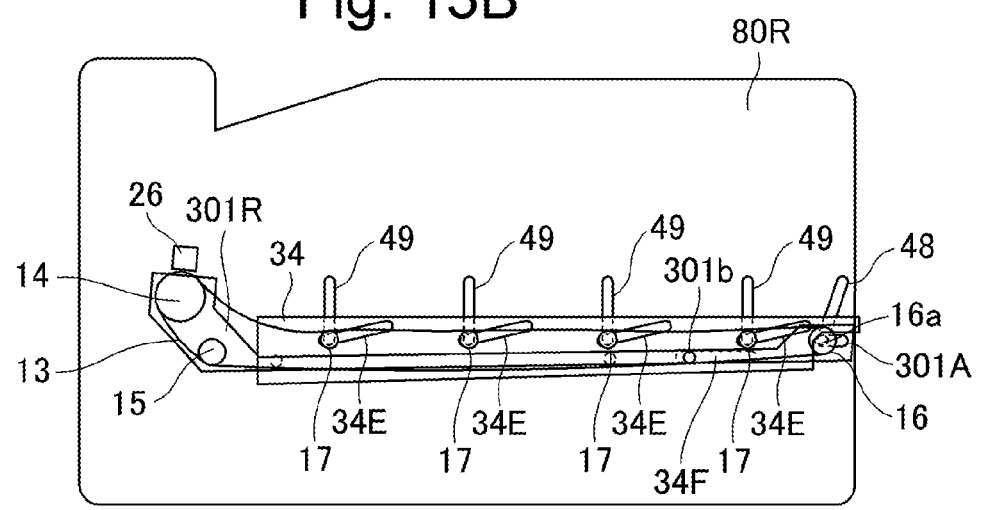

Referring to FIG. 10, the apparatus main assembly 100A is provided with a pair (left and right) of belt unit frames 301L and 301R, which are disposed on the left and right sides of the belt 13 of the intermediary transfer unit 12, respectively. Referring to FIG. 13, the driver roller 14 and auxiliary roller 13 are rotatably supported by the combination of the belt unit frames 301L and 301R. The lengthwise end portions 16a of the tension roller 16 are fitted in holes 301A, with which the belt unit frames 301L and 301R are provided, one for one, and which are horizontally elongated. Further, the lengthwise end portions 16a of the tension roller 16 are fitted in the tension roller guiding holes 48 of the plates 80L and 80R, one for one, which are described later. Thus, the tension roller 16 is afforded a certain amount of latitude, within the guiding range of the tension roller guiding holes 48, with respect to its movement relative to the belt unit frames 301L and 301R. Moreover, the front end portions of the belt unit frames 301L and 301R are provided with a pair of horizontal shafts 301b, one for one. Further, the horizontal shaft 301b of the left belt unit frame 301L is fitted in the horizontal hole 34F, with which the left tray holding member 34L is provided, whereas the horizontal shaft 301b of the right belt unit frame 301R is fitted in the hole 34F, with which the right tray holding member 34R is provided, and which is horizontally elongated. In the case of this mechanism, the belt 13 is suspended and tension by the combination of suspending/tensioning members, which includes the driver roller 14, auxiliary roller 15, and the tension roller 16.

The lengthwise end portions 17a of each of the four primary transfer rollers 17 are fitted in the four holes 34E, one for one, with which the tray holding members 34L and 34R are provided, and which are diagonally extended. However, the lengthwise end portions 17a of each primary transfer roller 17 are fitted in the primary transfer roller guiding holes 49 of the plates 80L and 80R. Thus, each primary transfer roller 17 is afforded a certain amount of latitude, within the guiding range of the primary transfer roller guiding hole 49, with respect to its movement relative to the left and right plates 80L and 80R.

The image forming apparatus 100 is structured so that the belt unit frames 301L and 301R are rotationally movable relative to the side plates 80L and 80R, about the axial line of the driver roller 14. In other words, the door 31 is in connection to the belt unit frames 301L and 301R, tension roller 16, and primary transfer rollers 17, by way of the tray holding members 34L and 34R. Thus, as the door 31 is opened or closed, force is applied to the belt unit frames 301L and 301R, tension roller 16, and primary transfer rollers 17 in the direction which is parallel to the lengthwise direction of the elongated holes, by the movement of the door 31.

Figure 14:
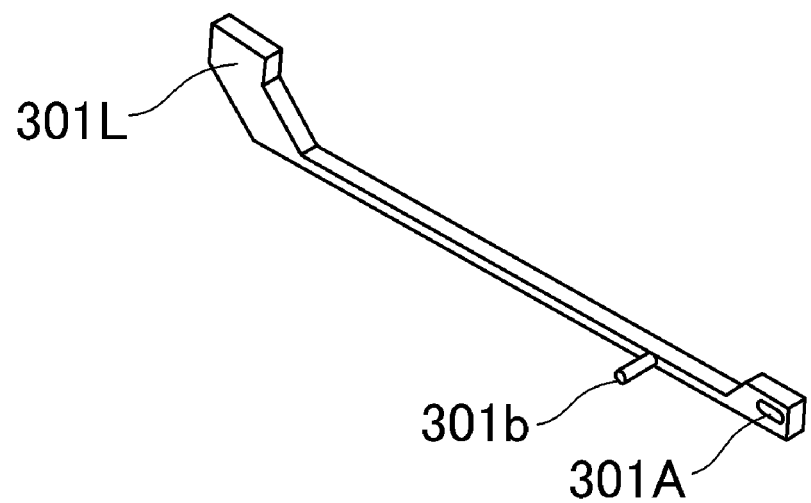
FIG. 14 is a perspective view of one (left) of the belt unit frames in the first embodiment.

FIG. 13 is a vertical sectional view of a combination of the right plate 80R, right belt unit frame 301R, primary transfer rollers 17, belt 13, etc., as seen from the left side of the combination. It is for describing the pivotal movement of the door 31, and what is caused to occur to the intermediary transfer unit 12 by the pivotal movement of the door 31. FIG. 14 is a perspective view of the belt unit frame 301L.

Shown in FIG. 13 are the horizontally elongated hole 301A and horizontal shaft 301b of the right belt unit frame 301R, diagonally extended tension roller guiding hole 48 and vertically extended primary transfer roller guiding hole 49 of the right side plate 80R. Although the left belt unit frame 301L and left side plate 80L are not shown in FIG. 13, they are similar to the right belt unit frame 301b and right side plate 80R, respectively. That is, the image forming apparatus 100 is structured so that the elongated hole 301A, horizontal shaft 301b, tension roller guiding hole 48, and the primary transfer roller guiding hole 49, which are in the left side of the apparatus 100, are the same is shape, and symmetrically positioned relative to the counterparts in the right side of the apparatus 100.

Part (a) of FIG. 13 shows the state of the aforementioned combination, in which the door 31 is in the closed attitude A, that is, the door 31 is completely shut against the apparatus main assembly 100A, and therefore, the opening 30 is completely covered by the door 31. When the image forming apparatus 100 is in this state, the belt unit frames 301L and 301R and primary transfer rollers 17 are in their uppermost positions, to which they were moved by the left and right tray holding members 34L and 34R. Further, the tension roller 16 is in its frontmost position, with respect to the front-rear direction, and also, in its topmost position, to which it was moved by the belt unit frames 301L and 301R. Further, the belt 13 is provided with a preset amount of tension, and the primary transfer rollers 17 are held in their preset position (second position) relative to the drums 1. Thus, the intermediary transfer unit 12 is ready for an image forming operation.

Part (b) of FIG. 13 shows a state of the aforementioned combination, in which the door 31 is halfway open. As the door 31 is opened when it is remaining closed as shown part (a) of FIG. 13, the left and right tray holding members 34L and 34R are moved frontward in the apparatus main assembly 100A, by the movement of the door 31. As the door 31, which is in the state shown in part (b) of FIG. 13, is opened wider, the tray holding members 34L and 34R moves diagonally downward. As for the belt unit frames 301L and 301R, they are supported by the side plates 80L and 80R so that they are allowed to rotationally move about the axial line of the driver roller 14, as described above. Thus, the belt unit frames 301L and 301R are rotationally moved downward by their horizontal shafts 301b, which are in the horizontally elongated holes 34F, with which the tray holding members 34L and 34R are provided. That is, the intermediary transfer unit 12 rotationally moves in the clockwise direction of FIG. 13, about the axial line of the driver roller 14. Thus, the horizontal shafts 301b of the belt unit frames 301L and 301R are positioned in the adjacencies of the mid point, with respect to the front-rear direction of the apparatus main assembly 100A, of the horizontally elongated holes 34F, with which the tray holding members 34L and 34R are provided. Further, the belt unit frames 301L and 301R rotate in the clockwise direction of FIG. 13, about the axial line of the driver roller 14. Consequently, the tension roller 16 moves both rearward and downward of the apparatus main assembly 100A while being guided by the tension roller guiding hole 48 of the right side plate 80R. During this movement of the tension roller 16, the lengthwise end portions 16a of the tension roller 16 are positioned in the adjacencies of the mid point of the horizontally elongated hole 301A of the belt unit frames 301L and 301R, with respect to the front-rear direction of the apparatus main assembly 100A. In addition, the primary transfer rollers 17 are moved downward of the apparatus main assembly 100A by the rotational movement of the belt unit frames 301L and 301R in the clockwise direction of FIG. 13, about the axial line of the driver roller 14, while being guided by the primary roller guiding hole 49 of each of the left and right side plates 80L and 80R. Further, the lengthwise ends of each primary transfer rollers 17 are positioned in the adjacencies of the mid point of the diagonally elongated hole 34E of the tray holding members 34L and 34R. Consequently, the belt 13 is deprived of tension, and therefore, the top portion of the belt 13, with respect to the belt loop, lowers due to its own weight, to a level at which it is supported by the primary transfer rollers 17. As the tension roller 16, which is one of the members by which the belt 13 is suspended and tensioned, is moved, the belt 13 is deprived of its tension, and therefore, the top portion of the belt 13 moves downward because of its own weight.

Part (c) of FIG. 13 shows the state of the image forming apparatus 100, in which the door 31 is fully open. As described above, when the apparatus 100 is in this state, the tray holding members 34L and 34R have finished their downward movement. Thus, they are remaining horizontal. As for the belt unit frames 301L and 301R, their horizontal shaft 301b is in the horizontally elongated hole 34f, with which the tray holding members 34L and 34R are provided, and the intermediary transfer unit 12 has finished its rotational movement in the clockwise direction about the axial line of the driver roller 14. Further, the horizontal shaft 301b of the left belt unit frame 301L is in the rear end of the horizontally elongated hole 34F of the left tray holding member 34L, and the horizontal shaft 301b of the right belt unit frame 301R is in the rear end of the horizontally elongated hole 34F of the right tray holding member 34R. Thus, the tension roller 16 moves to its rearmost position in the apparatus main assembly 100A while being guided by the tension roller guiding hole 48. During this movement of the tension roller 16, the left and right lengthwise end portions 16a of the tension roller 16 are at the rear end of the horizontally elongated holes 301A of the left belt unit frame 301L, and at the rear end of the horizontally elongated hole 301A of the right belt unit frame 301R, respectively. Further, the tension roller 16 is in its lowest position in the apparatus main assembly 100A. At the same time, the primary transfer rollers 17 move to their lowest position in the apparatus main assembly 100A while being guided by the primary transfer roller guiding holes 49. During this movement of each primary transfer roller 17, the left and right lengthwise ends of the primary transfer roller 17 is at the bottom end of the diagonally elongated hole 34E of the tray holding member 34L, and that of the tray holding member 34R, respectively. Thus, the belt 13 is more slackened than when it is in the state shown in part (b) of FIG. 13, and therefore, its top portion, with respect to the belt loop, moves further downward, because of its own weight, to a level at which it is supported by the primary transfer rollers 17. That is, as the tension roller 16, which is one of the members by which the belt 13 is supported and tensioned, moves further downward, the belt 13 become more slackened, and therefore, its top portion moves further downward, because of its own weight, to its noncontact position.

Thus, the above-described space Sp, which is necessary to allow the cartridges P and tray 35 to move downward and slide in the front-rear direction is created. That is, when the image forming apparatus 100 is in the above-described state, the cartridges P can be pulled out of the apparatus main assembly 100A from the front side of the apparatus main assembly 100A as shown in part (a) of FIGS. 15 and 16(a).

Up to this point, the operational sequence in which the closed door 31 is opened, and the belt 13 is slackened by the movement of the tension roller 16 which is caused by the mechanism for moving the intermediary transfer unit 12 by the movement of the door 13, was described. As the door 31 is closed, the mechanism follows the steps in the sequence in the opposite order. That is, as the door 31 is closed, the mechanism causes the tension roller 16 to move upward, whereby the top portion of the belt 13, which had moved to the noncontact position because of its own weight, is restored in tension, and therefore, it moves back into the contact position.

In this embodiment, the combination of the connective arms 37L and 37R, connective rods 201L and 201R, left and right lateral plates 80L and 80R, tray holding members 34L and 34R, and belt unit frames 301L and 301R makes up the means for manipulating the endless belt. That is, this means for manipulating the endless belt causes the opening movement of the door 31 to move the top portion of the bet 13 from the contact position to the noncontact position, and the closing movement of the door 31 to move the top portion of the belt 13 from the noncontact position to the contact position.

Further, the combination of the tray holding members 34L and 34R and belt unit frames 301L and 301R makes up the means for moving the top portion of the belt 13 from the contact position to the noncontact position, and the tray 35 from the image formation position to the non-image-formation position, by the movement of the door 31. Further, this means moves the top portion of the belt 13 from the noncontact position to the contact position with the use of the movement of the door 31, and the tray 35 from the non-image-formation position to the image formation position, also with the use of the movement of the door 31.

As described above, according to the above-described structural arrangement for the image forming apparatus 100, the space which is created as the top portion of the belt 13 of the intermediary transfer unit 12, with respect to the belt loop, is moved, is used to move the cartridges P away from the LED unit 11 in order to replace the cartridges P. Thus, this structural arrangement makes it possible to provide an electrophotographic image forming apparatus which does not require any space on top of the main assembly of the apparatus, and yet, is no greater in size than any comparable conventional electrophotographic image forming apparatus.

Embodiment 2

Up to this point, the image forming apparatus 100 which holds its cartridges P and LED unit 11 in the top portion of its main assembly 100A was described. Next, referring to FIGS. 17-24, an image forming apparatus structured to hold its cartridges P and LED unit under the intermediary transfer unit 12 in the apparatus main assembly 100A, is described as another embodiment of the present invention. In this embodiment, by the way, the LED unit 11 for exposing the drums 1 is disposed in the bottom portion of the apparatus main assembly 100A, more specifically, on the opposite side of the belt 13 from the drums 1. Otherwise, the image forming apparatus 100 in this embodiment is the same as the image forming apparatus 100 in the first embodiment, except for the structural features which are described next.

[Method for Replacing Cartridges]

In this embodiment, in order to improve the image forming apparatus 100 in usability with respect to cartridge replacement, the apparatus 100 is structured so that the cartridges P can be extracted from the apparatus main assembly 100A by opening the door 31, which is on the front side (front access). The direction in which the cartridges P are to be installed into, or uninstalled from, the apparatus main assembly 100A, is roughly parallel to the axial line of each drum 1. Further, the apparatus 100 is structured so that its front side, or the side from which the apparatus 100 is to be operated, corresponds to the left side of the image forming apparatus 100 in the first embodiment.

Figure 17:
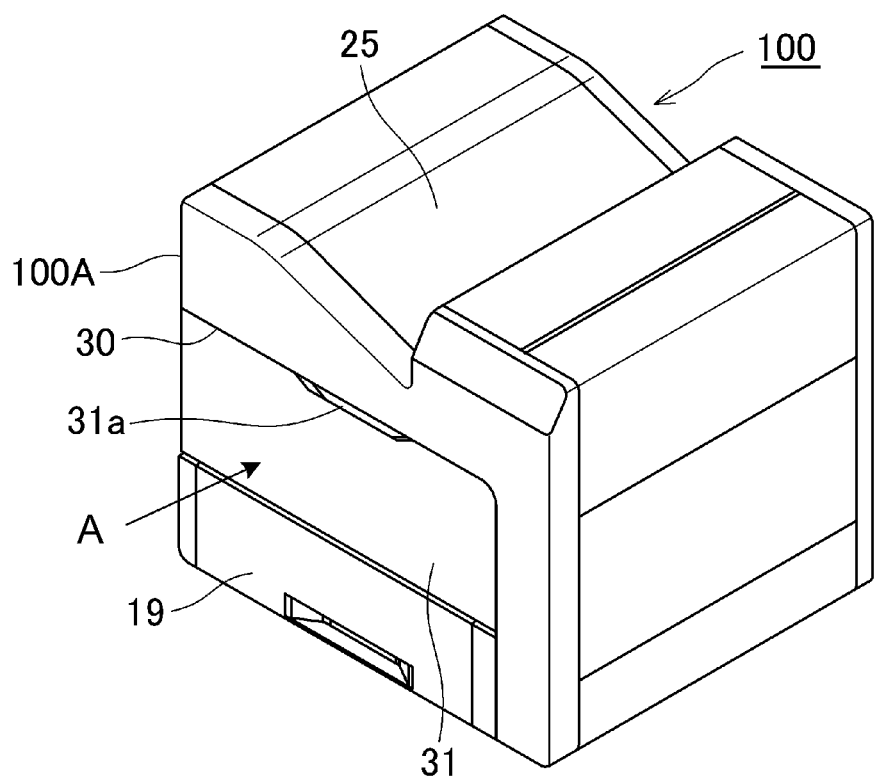
FIG. 17 is an external perspective view of the image forming apparatus in the second embodiment.
Figure 18:
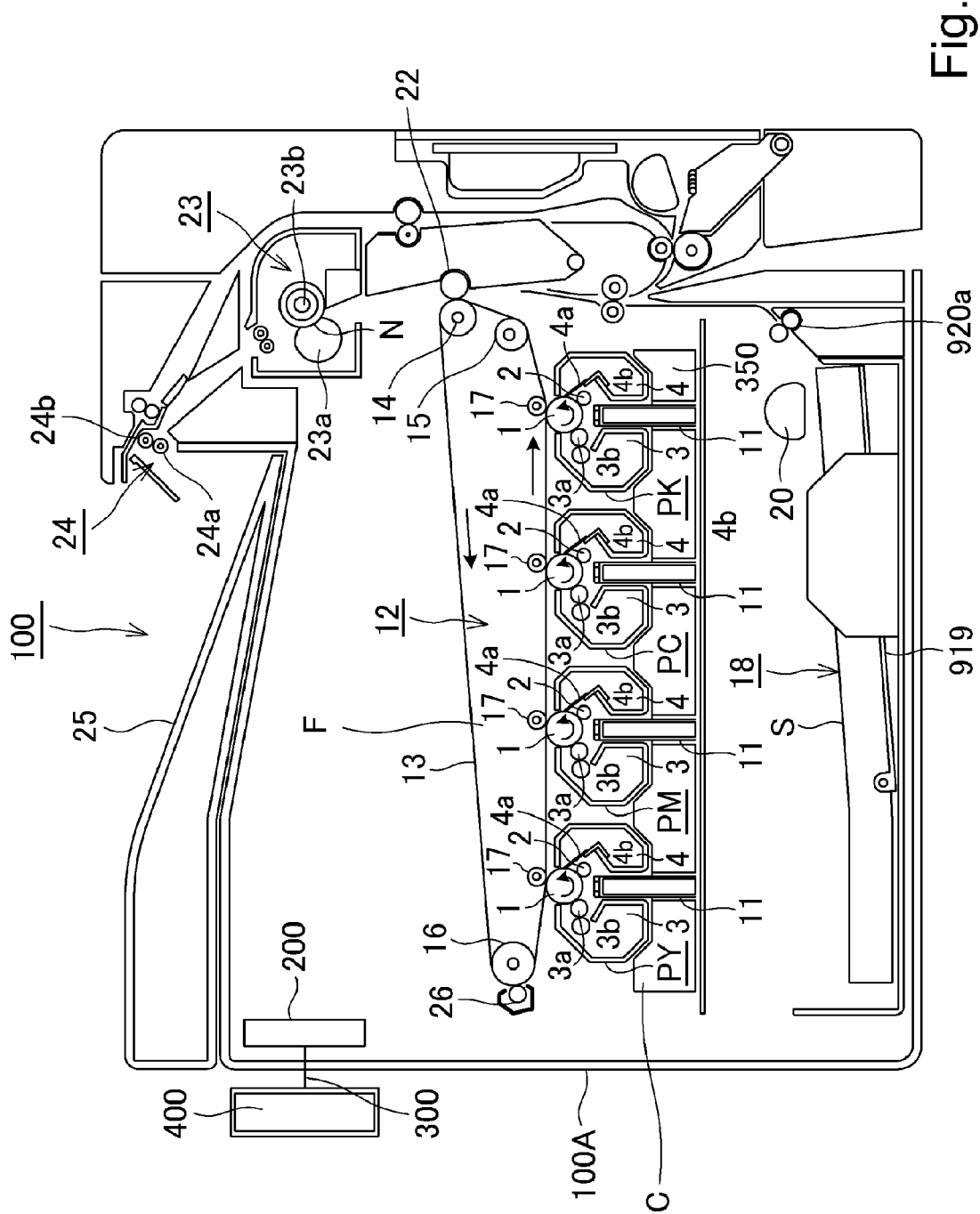
FIG. 18 is a vertical sectional view of the image forming apparatus in the second embodiment, as seen from the front side of the apparatus.
Figure 19:
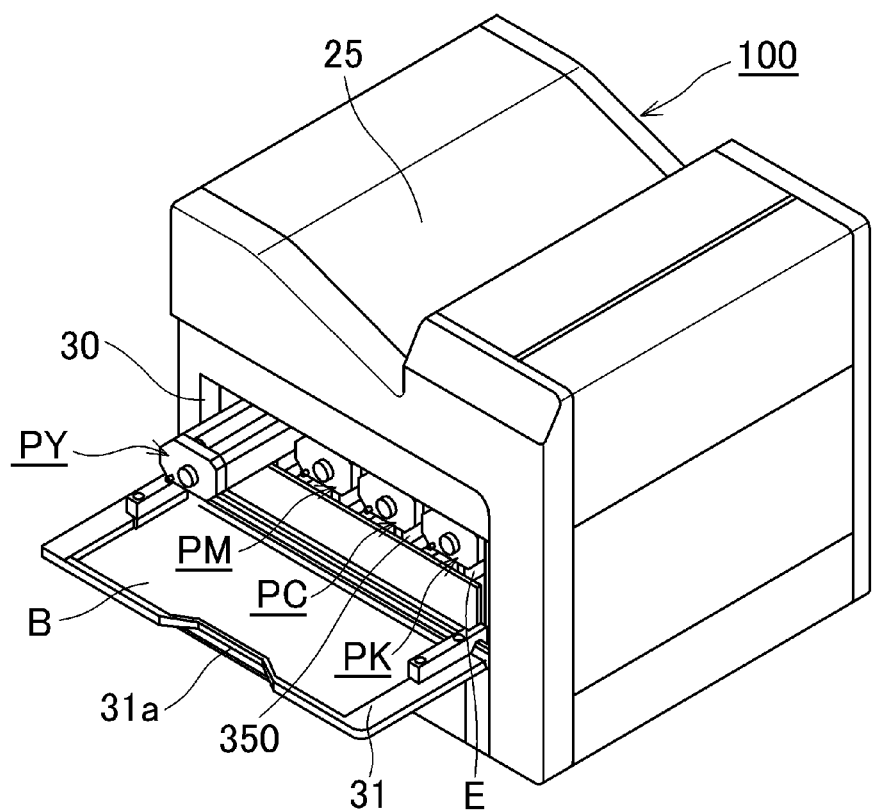
FIG. 19 is an external perspective view of the image forming apparatus in the second embodiment, when the door of the apparatus is open.
Figure 20:
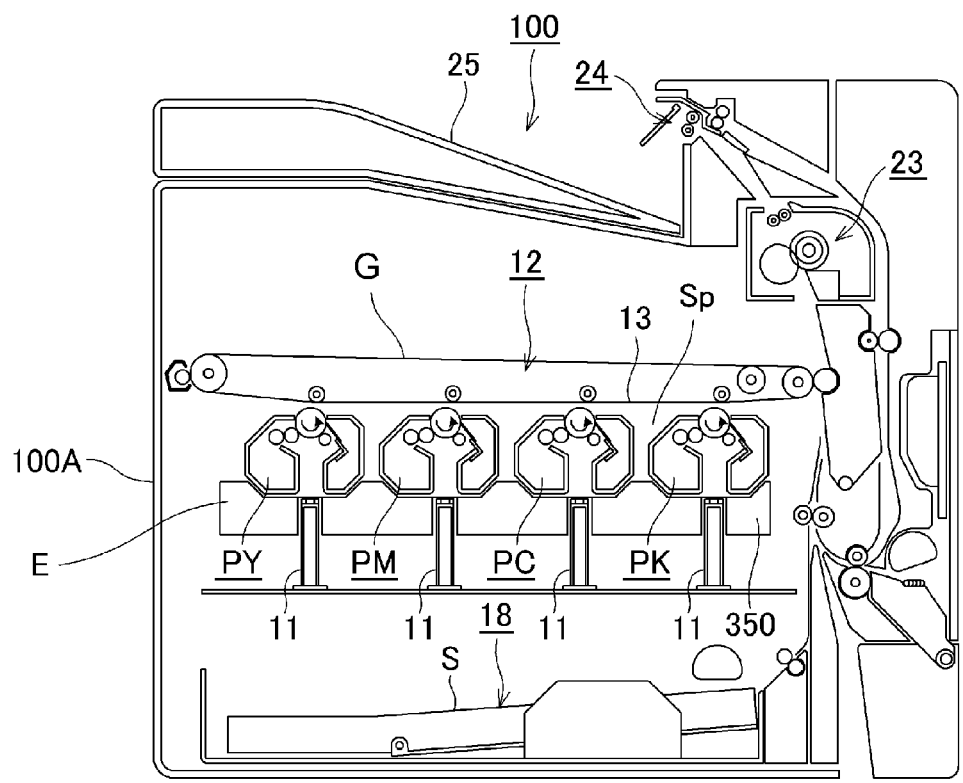
FIG. 20 is a vertical sectional view of the image forming apparatus in the second embodiment.

FIGS. 17 and 18 are perspective view and vertical sectional view, respectively, of the image forming apparatus 100, as seen from the front side of the apparatus 100 when the image forming apparatus 100 is ready for an image forming operation. FIGS. 19 and 20 are perspective and vertical sectional views, respectively, of the image forming apparatus 100, as seen from the front side of the apparatus 100 when the image forming apparatus 100 is ready for an operation for replacing the cartridges in the apparatus main assembly 100A.

Referring to FIG. 17, the image forming apparatus 100 is structured so that its door 31 is pivotally movable between its closed attitude A and open attitude B. A referential code 31a stands for a recess, with which the door 31 is provided to allow a user to grasp the door 31 with his or her fingers. That is, the main assembly door 31 is allowed to assume the attitude A in which it keeps the opening covered, or the attitude B in which it keeps the opening exposed.

In this embodiment, this door 31 can be pivotally opened or closed relative to the apparatus main assembly 100A, about the horizontal shaft 32 (hinge shaft) located along the bottom edge of the door 31. That is, the door 31 can be pivotally moved rearward about the hinge shafts 38L and 38R so that it becomes vertical to be shut against the apparatus main assembly 100 as shown in FIG. 17. That is, as this door 31 is closed, the opening 30 is covered.

Further, the door 31 can be pivotally moved frontward of the apparatus main assembly 100A about the hinge shafts 38L and 38R so that it becomes roughly horizontal to be open relative to the apparatus main assembly 100A as shown in FIG. 19. As the door 31 is pivotally moved frontward all the way, the opening 30 on the front side of the apparatus main assembly 100A is fully exposed. It is when the apparatus main assembly 100 is in this state that the cartridges P in the apparatus main assembly 100A are replaceable.

The apparatus main assembly 100A is provided with a cartridge lifting/lowering member 350 (cartridge supporting member) and a belt lifting/lowering member 401 (FIG. 22), and an intermediary transfer unit 12. When the door 31 is in the closed attitude A as shown in FIGS. 17 and 18, the cartridge supporting member 350 is in its image formation position C, in which it holds each cartridges P in a position in which cartridge P can be exposed by the LED unit 11; the belt lifting/lowering member 401 is in its preset position, in which it keeps the cartridges P and belt 13 ready for an image forming operation; and the intermediary transfer unit 12 is in the transfer position F, in which it is ready for an image forming operation. In this embodiment, the image formation position C for the cartridge lifting/lowering member 350 and the transfer position F for the intermediary transfer unit 12 are where the drum 1 of each cartridge P remains in contact with the belt 13 of the intermediary transfer unit 12, that is, contact positions (FIG. 18).

As the door 31 is rotationally opened, not only are the connective members 501L and 501R (FIG. 22) moved frontward by the movement of the door 31, but also, the cartridge lifting/lowering member 350 and belt lifting/lowering members 401 are moved upward by a preset amount by the movement of the door 31. Thus, the cartridges PY, PM, PC and PK are moved upward by the cartridge lifting/lowering member 350 from the abovementioned image formation position C to a cartridge mounting/dismounting position E. Further, the intermediary transfer unit 12 is moved upward by the belt lifting/lowering members 401 (FIG. 22) from the abovementioned transfer position F to the retraction position G as shown in FIG. 20. Further, as the connective members 501 move frontward, each cartridge P is moved away from the LED unit 11 by the movement of the connective members 501 as shown in FIG. 20. Consequently, the drum 1 in each cartridge P is separated from the belt 13. This retraction position G for the intermediary transfer unit 12 is such a position that when the intermediary transfer unit 12 is in this position, the belt 13 is separated from the drums 1 (photosensitive members), that is, a noncontact position. The detailed description of the mechanism for causing the connective members 501 and belt lifting/lowering members 401 is given later.

Further, as the door 31 is rotationally moved, not only is each cartridge P unlocked by the movement of the door 31, from the position in which it was kept, but also, the unshown electrical contact of each cartridge P is disengaged from the power supply system of the apparatus main assembly 100A; electrical connection between the electrical contact of each cartridge and apparatus main assembly 100A is disrupted (electrical power disengagement). Further, the unshown driving force input portion of each cartridge P is disengaged from the drive force output portion of the apparatus main assembly 100A (mechanical power disengagement).

Consequently, it becomes possible for each cartridge P to be pulled out of the apparatus main assembly 100A from the cartridge mounting/dismounting position E in the apparatus main assembly 100A, so that cartridges to be replaced, for example, cartridges which have become unsatisfactory in image quality, can be pulled out of the apparatus main assembly 100A in the frontward direction, and a replacement cartridge therefor can be inserted. That is, the cartridges P can be installed into, or uninstalled from, the apparatus main assembly 100A when the door 31 is open.

[Cartridge]

Figure 21:
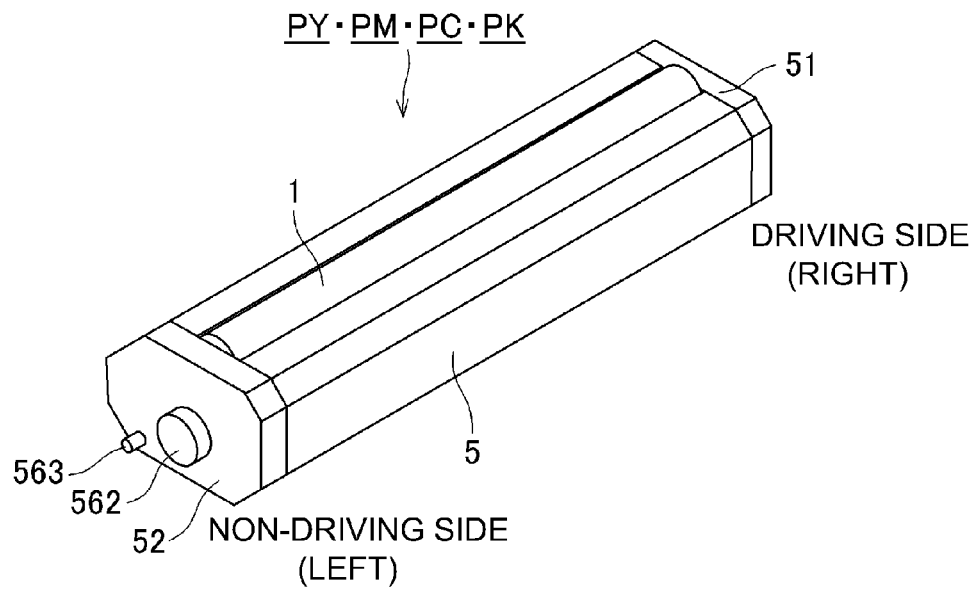
FIG. 21 is a perspective view of one of the cartridges in the second embodiment, as seen from the non-drive side, or the side from which the cartridge is not driven.

FIG. 21 is a perspective view of one of the cartridges P in this embodiment, as seen from the non-drive side, or the side from which it is not driven. In this embodiment, each cartridge P is an assembly of various members inclusive of the drum 1. It is long and narrow. Its lengthwise direction is parallel to the axial line of the drum 1. It is installed in the apparatus main assembly 100A so that its lengthwise direction becomes parallel to the front-rear direction of the apparatus main assembly 100A, and also, so that the axial line of each drum 1 is parallel to the front-rear direction of the image forming apparatus 100. The drum 1 is rotatably supported by and between a pair of bearings 51 and 52, with which the front and rear walls of the cartridge frame are provided one for one. The front bearing 52 is provided with a positioning portion 562 and a rotation prevention shaft 563. The rear bearing 51 is provided with an unshown drum driving force input portion (connective portion for transmitting driving force) for driving the drum 1, and an unshown developer roller driving force input portion (connective portion for transmitting driving force) for driving the development roller 3a. Further, the rear bearing 51 is provided with an unshown cartridge electrical contact (portion for supplying cartridge with electric power), and an unshown cartridge grounding contact. Further, the bottom wall of the cartridge frame 5 is provided with an unshown exposure window, which extends in the lengthwise direction of the cartridge P.

[Mechanism for Moving Connective Members by Movement of Door]

Figure 22:
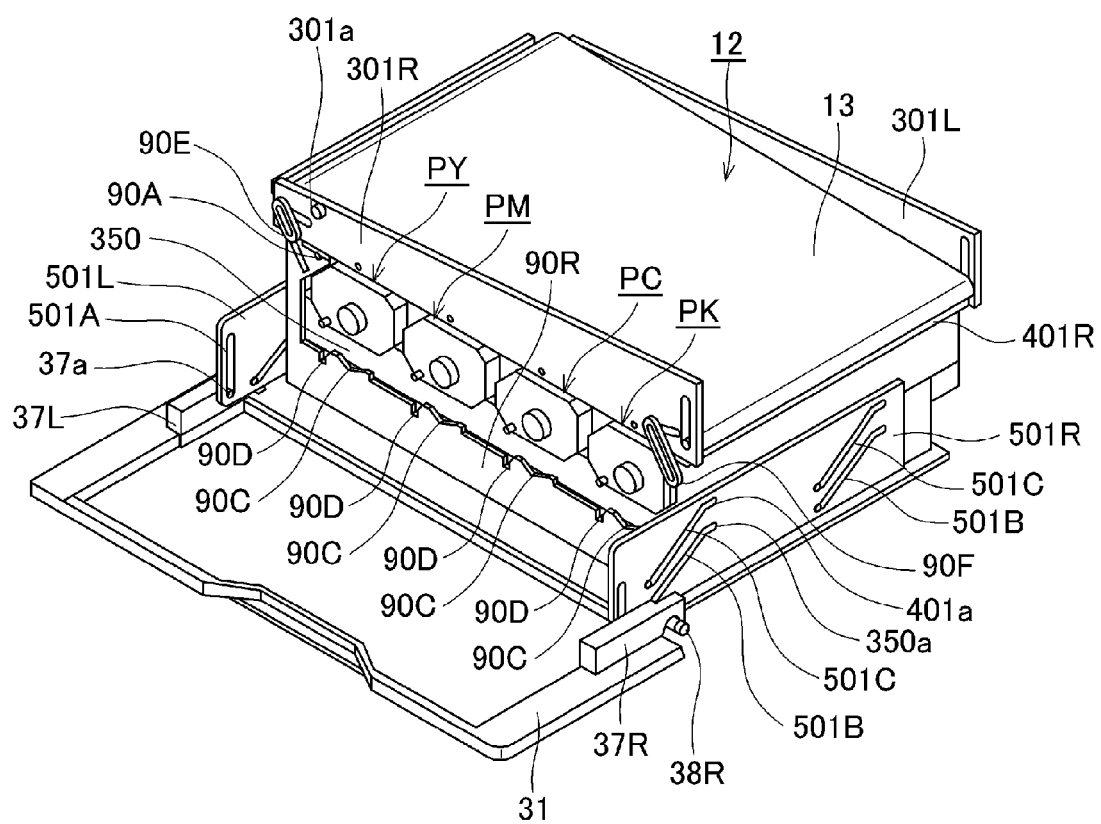
FIG. 22 is a perspective view of a combination of the door, connective members, and mechanism for moving the connective member by the movement of the door, in the second embodiment.
Figure 23A:
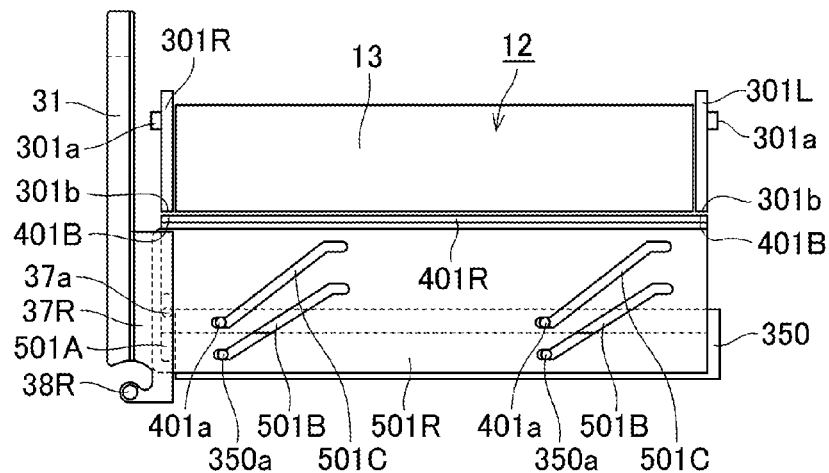
FIGS. 23A, 23B, and 23C illustrate the rotational movement of the door, and the movement of the connective members caused by the movement of the door, in the second embodiment.
Figure 23B:
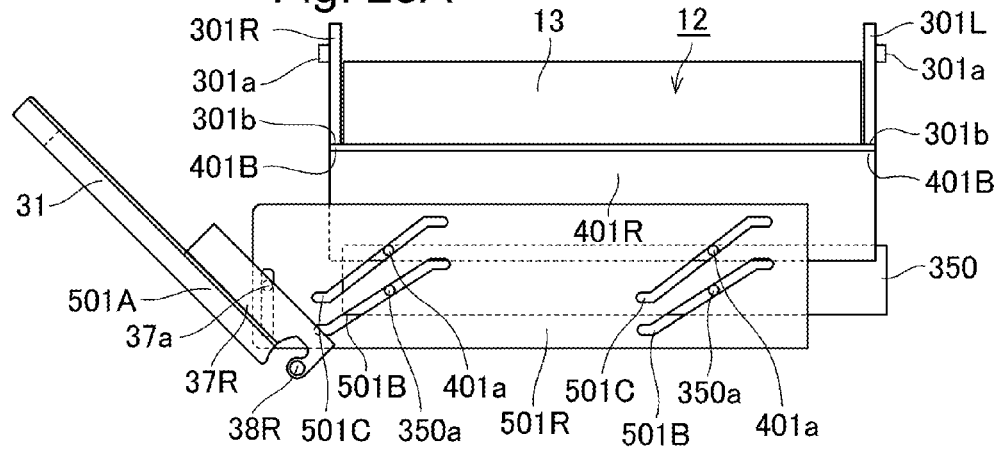
Figure 23C:
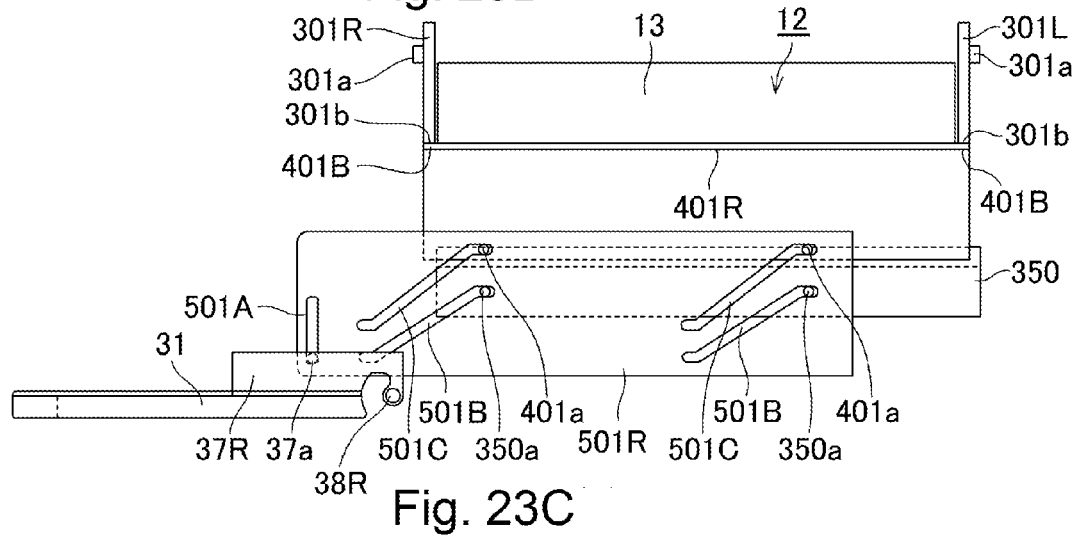
Figure 24A:
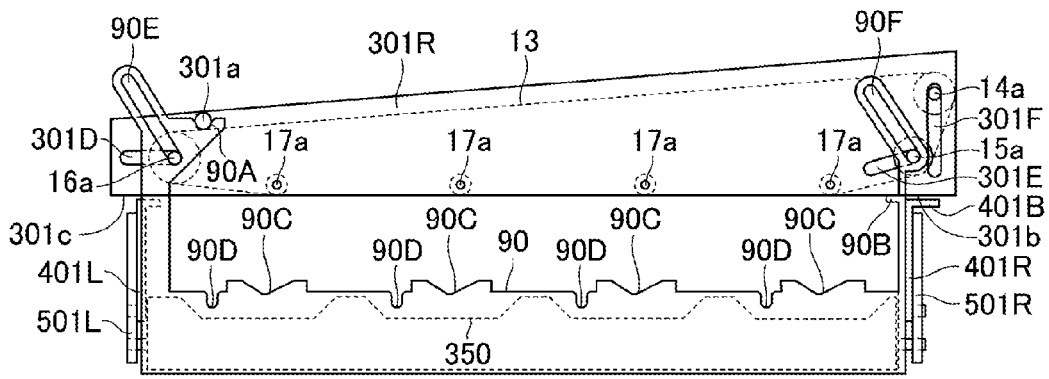
FIGS. 24A, 24B, and 24C illustrate the rotational movement of the door, and the movement of the intermediary transfer unit caused by the movement of the door, in the second embodiment.
Figure 24B:
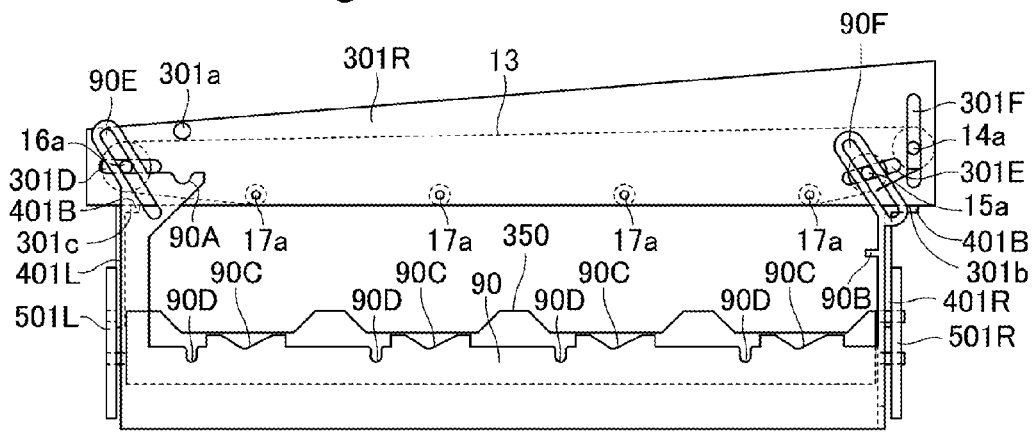
Figure 24C:
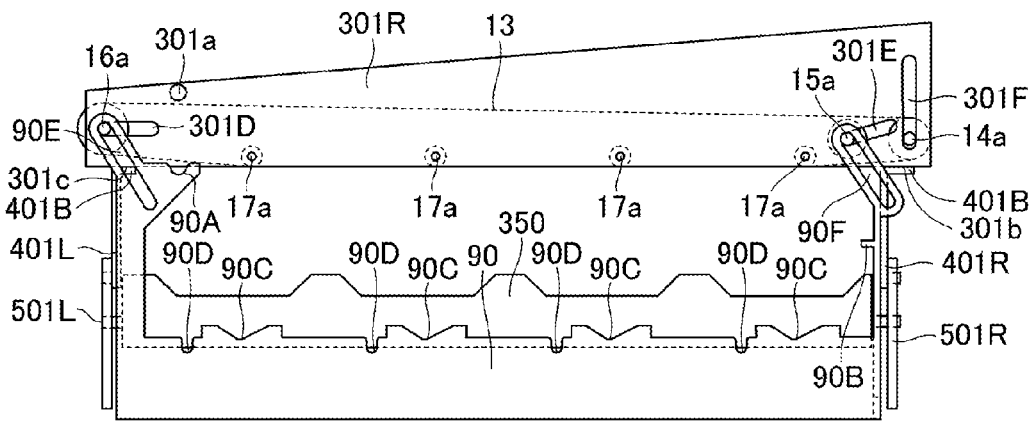

Next, referring to FIGS. 22-24, the mechanism for moving the connective members 501 by the movement of the door 31 is described. FIG. 22 is a perspective view of the mechanism for moving the connective members 501 by the movement of the door 31. The image forming apparatus 100 is provided with a pair of connective arms 37L and 37R, which are attached to the left and right end portions of the door 31, respectively. The connective arms 37L and 37R are provided with a pair of hinge shafts 38L and 38R, respectively, which are attached to the connective arms 37L and 37R so that they extend in the left-right direction of the apparatus main assembly 100A, in alignment with each other, after the attachment of the door 31 to the apparatus main assembly 100A. The hinge shafts 38L and 38R are rotatably supported by an unshown pair of bearings, with which the left and right sides of the apparatus main assembly 100A are provided, respectively.

Further, the image forming apparatus 100 is provided with a pair (left and right) of connective members 501L and 501R, which correspond in position to the left and right end portions of the door 31, and the lengthwise direction of which is parallel to the front-rear direction of the apparatus main assembly 100A. The connective members 501L and 501R are supported an unshown pair of guiding members, with which the left and right sides of the apparatus main assembly 100A are provided, one for one, so that they are allowed to move only in the front-rear direction.

Each of the connective arms 37L and 37R is provided with a horizontal arm 37a. The horizontal arm 37a of the left connective arm 37L is fitted in a vertically elongated hole 501A, with which the front end portion of the left connective member 501L is provided. Although the horizontal shaft 37a of the right connective arm 37R is unshown, it is fitted in the vertically elongated hole 501A, with which the front end portion of the right connective member 501R is provided. Further, each of the connective members 501L and 501R is provided with two pairs of guiding holes 501B and 501C, which are located in the front and rear end portions of each connective member 501, one for one.

A cartridge lifting/lowering member 350 is provided with two pair of horizontal shafts 350a, which are attached to the left and right ends of the cartridge lifting/lowering member 350, and are fitted in the two pairs of guiding holes 501B, one for one, with which each of the connective members 501L and 501R is provided to guide the cartridge lifting/lowering member 350. The cartridge lifting/lowering member 350 is supported by an unshown pair of guiding members, which are located in the front and rear portions of the apparatus main assembly 100A, one for one, so that it is allowed to move only in the vertical direction. Further, the cartridge lifting/lowering member 350 is shaped so that it can function as a guide for guiding each cartridge P when the cartridge P is installed or uninstalled.

As described above, the door 31 is in connection to the cartridge lifting/lowering member 350 by way of a combination of the connective arms 37L and 37R and connective members 501L and 501R. Thus, as the door 31 is opened or closed, force is applied to the cartridge lifting/lowering member 350 in the upward or downward direction, respectively.

The intermediary transfer unit 12 is provided with a pair (front and rear) of frames 301R and 301L, which are supported by an unshown pair of guiding members, with which the front and rear portion of the apparatus main assembly 100A are provided, one for one, so that they are allowed to move only in the vertical direction. The left end portion of each of the belt unit frames 301R and 301L is provided with a horizontal shaft 301a. Referring to part (c) of FIG. 24, the bottom surface 301b of each of the belt unit frame 301L and 301R is in contact with the top surface 401B of the corresponding belt lifting/lowering member 401 (401L or 401R).

The belt lifting/lowering members 401L and 401R are supported by an unshown pair (left and right) of guiding members, with which the left and right sides of the apparatus main assembly 100A are provided, one for one, so that they are allowed to move only in the vertical direction. Further, each of the belt lifting/lowering members 401L and 401R is provided with a pair of horizontal shafts 401a, which are attached to the front and rear end portions of each belt lifting/lowering member 401, and which are fitted in the pair of belt lifting/lowering member guiding holes 501C, with which each of the connective members 501L and 501R is provided.

As described above, the door 31 is in connection to the belt lifting/lowering members 401L and 401R by way of the pair of connective arms 37L and 37R and pair of connective members 501L and 501R. Therefore, as the door 31 is opened or closed, force is applied to the belt lifting/lowering members 401L and 401R in the vertical direction.

FIG. 23 shows the vertically elongated hole 501A, pair of cartridge lifting/lowering member guiding holes 501B, and pair of belt lifting/lowering member guiding holes 501C, of the right connective member 501R. It shows also the pair of horizontal shafts 401a of the cartridge lifting/lowering member 350, and the pair of horizontal shafts 401a of the right belt lifting/lowering member 401R. Although the left connective member 501L, pair of horizontal shafts 401a of the left end of the cartridge lifting/lowering member 350, and left belt lifting/lowering member 401L are not shown, they are the same as those on the right side. That is, the vertically elongated hole 501A, pair of cartridge lifting/lowering member guiding holes 501B, pair of belt lifting/lowering member guiding holes 501C, and horizontal shafts 350a and 401a, which the left side of the apparatus main assembly 100A has, are the same in shape as the counterparts of the right side of the 100A, and are symmetrically positioned relative to the counterparts.

part (a) of FIG. 23 shows the image forming apparatus 100 in such a state that the door 31 is in its closed attitude A, being therefore completely shut relative to the apparatus main assembly 100A, that is, the opening 30 is completed covered with the door 31. When the apparatus 100 is in this state, the cartridge lifting/lowering member 350 and the pair of belt lifting/lowering members 401L and 401R are in the bottom portion of the apparatus main assembly 100A, to which they were lowered by the combination of the pair of connective arms 37L and 37R and the pair of connective members 501L and 501R. As for the horizontal shafts 350a of the cartridge lifting/lowering member 350 and the horizontal shafts 401a of the belt lifting/lowering member 401L, they are in the front ends of the cartridge lifting/lowering member guiding holes 501B of the connective members 501L and 501R and the front ends of the belt lifting/lowering member guiding hole 501C, one for one.

Therefore, each cartridge P and the belt unit frames 301L and 301R are in their preset positions (second positions) relative to the main frame 90. That is, the cartridge lifting/lowering member 350 is held in its preset position (second position), that is, the image formation position C (FIG. 18). Further, the intermediary transfer unit 12 is also held in its preset position (second position), that is, the transfer position (FIG. 18), and the belt 13 of the intermediary transfer unit 12 is also in its contact position, or the position in which it remains in contact with the drum 1 of each cartridge P.

Further, as the belt unit frames 301L and 301R and cartridge lifting/lowering member 350 are moved to their preset positions by the movement of the door 31, the driving force output portion of the apparatus main assembly 100A is engaged with the driving force input portion of each cartridge, and the drive side (rear side) of each cartridge P is precisely positioned with respect to both the left-right direction and vertical direction. Further, each cartridge P is moved toward the drive side (rearward) by the pressure which receives from the unshown pressing portion of the apparatus main assembly 100A, whereby it is precisely positioned with respect to its lengthwise direction. Further, the positioning portion of each cartridge P becomes engaged with the positioning portion 90C (FIG. 22) of the main frame 90, whereby the non-drive side (front side) of each cartridge P is precisely positioned with respect to both the left-right direction and vertical direction. Moreover, the rotation prevention shaft 563, with which each cartridge P is provided, fits into the elongated rotation prevention hole 90D (FIG. 22), with which the main frame 90 is provided, whereby the cartridge P is prevented from rotationally moving about the axial line of the positioning portion 562. That is, each cartridge is precisely positioned relative to the apparatus main assembly 100A.

Further, the left horizontal shaft 301a of the belt unit frame 301L and that of the belt unit frame 301R are fitted in the corresponding positioning holes 90A (FIG. 22) of the main frame 90, one for one, whereby the belt unit frames 301L and 301R are precisely positioned with respect to both the left-right direction and vertical direction. Further, the positioning portion 301b, which the bottom surface of the right end portion of the belt unit frame 301L has, and the positioning portion 301b, which the bottom surface of the right end portion of the belt unit frame 301R has, come into contact with the positioning portions 90B (FIG. 24) of the main frame 90, one for one, whereby the belt unit frames 301L and 301R (intermediary transfer unit 12) are prevented from rotationally moving about the axial line of the horizontal shafts 301a. That is, the intermediary transfer unit 12 is precisely positioned relative to the apparatus main assembly 100A.

When the image forming apparatus 100 is in the state described above, a space is present between the bottom of the combination of cartridges P and the top of the cartridge lifting/lowering member 350. Further, a space is present between the bottom surface 301c (part (a) of FIG. 24) of the left end portion of the belt unit frames 301L and the top surface 401B of the belt lifting/lowering member 401L, between the bottom surface 301b of the right end portion of the belt unit frame 301L and the top surface 401B of the belt lifting/lowering member 401R, and between the bottom surface 301b of the left end portion of the belt unit frame 301R and the top surface 401B of the belt lifting/lowering member 401R. When the image forming apparatus 100 is in the above-described state, it is assured that the top portion of the peripheral surface of the drum 1 in each cartridge P remains in contact with the downwardly facing portion of the outward surface of the belt 13 of the intermediary transfer unit 12, and electrical power can be supplied to the electrical contact of each cartridge from the apparatus main assembly 100A.

Part (b) of FIG. 23 shows the image forming apparatus 100 when its door 31 is open halfway. As the door 31 is opened further while it is in the state shown in part (a) of FIG. 23, the left and right connective members 501L and 501R are moved frontward by the movement of the door 31, in the apparatus main assembly 100A. Consequently, the cartridge lifting/lowering member 350 is moved vertically upward, with its horizontal shafts 350a being guided by the cartridge lifting/lowering member guiding holes 501B, and the belt lifting/lowering members 401L and 401R are moved vertically upward, with their horizontal shafts 401a being guided by the belt lifting/lowering member guiding holes 501C.

While the cartridge lifting/lowering member 350 is moved vertically upward, first, the electrical connection between the electrical contact of each cartridge P and the apparatus main assembly 100A is dissolved. Then, the driving force input portion of each cartridge P is disengaged from the driving force output portion of the apparatus main assembly 100A.

As the door 31 is opened wider, the connective members 501L and 501R are moved further outward of the apparatus main assembly 100A, in the apparatus main assembly 100A by the movement of the door 31. Thus, the cartridge lifting/lowering members 401L and 401R are moved further upward, causing the top surface of the cartridge lifting/lowering member 350 to come into contact with the bottom surface of each cartridge P, and each cartridge P to separate from the main frame 90. Consequently, each cartridge P is supported by the cartridge lifting/lowering member 350. Further, the belt unit frames 301L and 301R are separated from the main frame 90, and the bottom surfaces 301*b* and 301*b* of the belt unit frames 301L and 301R, respectively, come into contact with the top surfaces 401B of the belt lifting/lowering members 401L and 401R, respectively, as shown in part (b) of FIG. 24. That is, the intermediary transfer unit 12 is supported by the belt lifting/lowering members 401L and 401R. Thus, each cartridge P moves upward with the cartridge lifting/lowering member 350, and the intermediary transfer unit 12 moves with the belt lifting/lowering members 401L and 401R. While the cartridge lifting/lowering member 350 and belt lifting/lowering members 401L and 401R are moved upward, it does not occur that they move in the horizontal direction, since they have been fixed in position with respect to the front-rear direction as described above. That is, they move only in the vertical direction. Part (b) of FIG. 23 shows the image forming apparatus 100 while the cartridge lifting/lowering member 350 and belt lifting/lowering members 401L and 401R are moved only in the vertically upward direction. By the way, the pair of belt lifting/lowering member guiding holes 501C of the connective member 501L and those of the connective member 501R are greater in angle than the pair of belt lifting/lowering member guiding holes 501C of the connective member 501L and those of the connective member 501R. That is, the amount by which the belt lifting/lowering members 401L and 401R are vertically moved by the frontward movement of the connective members 501L and 501R is greater than the amount by which the cartridge lifting/lowering member 350 is vertically moved by the frontward movement of the connective members 501L and 501R. That is, the amount by which the intermediary transfer unit 12 is moved is greater than the amount by which each cartridge P is vertically moved. Therefore, it is possible for each cartridge P to move into a space created by the upward movement of the intermediary transfer unit 12. Thus, each cartridge separates from the LED unit 11, and each drum 1 separates from the belt 13 of the intermediary transfer unit 12.

Part (c) of FIG. 23 shows the state of the image forming apparatus 100, in which the door 31 is fully open. When the apparatus 100 is in this state, the connective members 501L and 501R have been moved frontward all the way by the connective arms 38L and 38R, and their horizontal shafts 37*a* are in the bottom end of the elongated holes 501A. Further, the cartridge lifting/lowering member 350 and belt lifting/lowering members 401L and 401R have to been moved upward by the connective members 501L and 501R, and their horizontal shafts 350*a* and 401*a* are in the rear horizontal guiding portions of the cartridge lifting/lowering member guiding holes 501B, and the rear horizontal portions of the belt lifting/lowering member guiding holes 501C, respectively. This structural arrangement is for keeping the cartridge lifting/lowering member 350 and cartridges P stable in position with respect to the vertical direction, when the cartridges P are slid out of the cartridge lifting/lowering member 350 to be replaced.

As described above, the cartridge lifting/lowering member 350 is moved upward, and then, it is held in its preset cartridge mounting/dismounting position E (first position (FIG. 20) relative to the apparatus main assembly 100A. Thus, each of the cartridges P in the cartridge lifting/lowering member 350 also are moved upward, and then, are held in its preset position (first position). As for the belt lifting/lowering members 401L and 401R, they are moved upward, and then, are held in their preset position relative to the apparatus main assembly 100A. Therefore, the intermediary transfer unit 12 held by the belt lifting/lowering members 401L and 401R is moved from its preset position (first position), that is, the transfer position F (FIG. 18), to the cartridge-mounting/dismounting position G (FIG. 20), and is held therein. By the way, the cartridge-mounting/dismounting position G corresponds to the position into which the belt 13 moves away from the drums 1 (photosensitive members), that is, the noncontact position. Further, the cartridge mounting/dismounting position E is such a position that the cartridge lifting/lowering member 350 is closer (no-image-formation position) to the belt 13 in the noncontact position than when the cartridge lifting/lowering member 350 is in the image formation position C (FIG. 18). As the belt 13 moves from its contact position to its noncontact position, the space Sp (storing portion) (FIG. 20) is created. By the way, when the cartridge lifting/lowering member 350 is in its cartridge mounting/dismounting position E, each cartridge P or at least a part of the tray 35, which in this embodiment is a part of each cartridge P, can be held in the space Sp. Since the intermediary transfer unit 12 is moved upward as described above, the space necessary for moving the cartridges P upward and sliding the cartridges P in the front-rear direction is provided.

When the apparatus main assembly 100 is in the above-described state, each cartridge P had been moved away from the LED unit 11, being therefore horizontally slidable in the front-rear direction relative to the cartridge lifting/lowering member 350. That is, it is possible to install a cartridge into, or uninstalled from, the apparatus main assembly 100A.

Up to this point, the sequence to make it possible for the cartridges P in the apparatus main assembly 100A to be moved out of the apparatus main assembly 100A through the opening 30, by opening the door 31, has been described. As the open door 31 is closed, the mechanism for causing the cartridge lifting/lowering member 350 to be moved by the movement of the door 31 reversely follows the above-described sequence, so that the cartridge lifting/lowering member 350 is moved from the cartridge mounting/dismounting position E to the image formation position C.

By the way, the combination of the pair of connective arms 37L and 37R and the pair of connective members 501L and 501R makes up the means for manipulating the cartridges P. That is, as the door 31 is opened, the cartridge lifting/lowering member 350 is moved from the image formation position to the no-image-formation position by this cartridge manipulating means, whereas as the door 31 is closed, the cartridge lifting/lowering member 350 is moved from the no-image-formation position to the image-formation position by the cartridge manipulating means.

[Mechanism for Moving Intermediary Transfer Unit by Movement of Door]

Next, referring to FIGS. 22-24, the mechanism for moving the intermediary transfer unit 12 by the movement of the door 31 is described.

Referring to FIG. 24, the lengthwise end portions 17a of each of the four primary transfer rollers 17 are rotatably supported by the belt unit frames 301L and 301R of the intermediary transfer unit 12. Each of the belt unit frames 301L and 301R is provided with a horizontally elongated hole 301D, a diagonally elongated hole 301E, and a vertically elongated hole 301F. Further, the lengthwise end portions 16a of the tension roller 16 are fitted in the horizontally elongated holes D, one for one, and also, in the tension roller guiding holes 90E of the main frame 90, one for one, which are described later. Thus, the tension roller 16 is afforded a certain amount of latitude with respect to its movement relative to the belt unit frames 301L and 301R, within the guiding range of the tension roller guiding holes 90E, and also, within the guiding range of the horizontally elongated holed 301D.

Further, the lengthwise end portions 15a of the auxiliary roller 15 are fitted in the diagonally elongated holes 301E, with which the belt unit frames 301L and 301R are provided, one for one, and also, in the auxiliary roller guiding holes 90F of the main frame 90, one for one, which are described later. Thus, the auxiliary roller 15 is afforded a certain amount of latitude with respect to its movement relative to the main frame 90 and belt unit frames 301L and 301R, within the guiding range of the auxiliary roller guiding holes 90F, and that of the diagonally elongated holes 301E, respectively.

Further, the lengthwise end portions 14a of the driver roller 14 are fitted in the vertically elongated holes 301F, with which the belt unit frames 301L and 301R are provided, one for one, and also, are rotatably supported by the main frame 90. Therefore, the driver roller 14 is afforded a certain amount of latitude with respect to its movement relative to the belt unit frames 301L and 301R, within the guiding range of the vertically elongated holes 301F, although it is afforded no amount of latitude with respect to its movement relative to the main frame 90.

FIG. 24 shows the horizontally elongated hole 301D, diagonally elongated hole 301E, and vertically elongated hole 301F of the front belt unit frame 301R, and the diagonally elongated tension roller guiding hole 301E and diagonally elongated auxiliary roller guiding holes 301F of the main frame 90. Although the rear belt unit frame 301L and the rear side of the main frame 90 are not shown in FIG. 24, they are similar to the front belt unit frame 301R and the front side of the main frame 90, respectively. That is, the image forming apparatus 100 is structured so that the rear belt unit frame 301L and the rear side of the main frame 90 are the same in the shape and positioning of the horizontally elongated hole 301D, diagonally elongated hole 301E, vertically elongated hole 301F, tension roller guiding hole 90E, and auxiliary roller guiding hole 90F, as the front belt unit frame 301R and the front side of the main frame 90, respectively, and are symmetrically positioned relative to the front belt unit frame 301R and the front side of the main assembly 90, respectively.

As described above, the door 31 is in connection to the belt unit frames 301L and 301R, auxiliary roller 15, and tension roller 16, by way of the pair of connective members 501L and 501R, and pair of belt lifting/lowering members 401L and 401R. Thus, as the door 31 is opened or closed, force is applied to the belt unit frames 301L and 301R, auxiliary roller 15, and tension roller 16 in the direction which is parallel to the corresponding elongated holes.

Part (a) of FIG. 24 shows the state of the image forming apparatus 100, in which the apparatus main assembly 100A (opening 30) is completely shut, that is, the door 31 is in the attitude A. When the apparatus main assembly 100 is in this state, the tension roller 16 and auxiliary roller 15 are in their bottommost positions with respect to the vertical direction, and also, their rightmost positions, in the apparatus main assembly 100A, into which they were guided by the belt unit frames 301L and 301R. As for the primary transfer roller 17, it is in its bottommost position in the apparatus main assembly 100A with respect to the vertical direction. Further, the driver roller 14 is in its topmost position relative to the belt unit frames 301L and 301R, with respect to the vertical direction.

Also in this state, the belt 13 is provided with a preset amount of tension, and each primary transfer roller 17 is held in the preset position (second position) relative to the drum 1, that is, the position in which the belt 13 is in contact with the drum 1. In other words, the intermediary transfer unit 12 is ready for an image forming operation. By the way, the combination of the drive roller 14, auxiliary roller 15, and tension roller 16 makes up the endless belt supporting members; the belt 13 is suspended and tensioned by the belt supporting/tensioning members which include the driver roller 14, auxiliary roller 15, and tension roller 16.

Part (b) of FIG. 24 shows the state of the image forming apparatus 100, in which the door 31 is halfway open. As described above, as the door 31 is opened as shown in part (a) of FIG. 24, the intermediary transfer unit 12 is moved upward, along with the belt lifting/lowering members 401L and 401R, by the movement of the door 31. At the same time, the tension roller 16 moves upward as well as leftward, since it is fitted in the diagonally elongated hole 90E, with which the main frame 90 is provided. Further, the lengthwise end portions 16a of the tension roller 16 are moved into the approximate centers of the horizontally elongated holes 301D, with respect to the left-right direction of the apparatus main assembly 100A, with which the belt unit frames 301L and 301R are provided. As for the auxiliary roller 15, it is moved upward as well as leftward, since it is fitted in the diagonally elongated holes 90F, with which the main frame 90 is provided. Further, the lengthwise end portions 15a of the auxiliary roller 15 are moved to the approximate centers of the diagonally elongated holes 301E of the belt unit frames 301L and 301R, with respect to the left-right direction of the apparatus main assembly 100A. Since the movement of the tension roller 16 and that of the auxiliary roller 15 are caused at the same time, the belt 13 moves, with its tension remaining at roughly the same level. Thus, the belt 13 moves upward with the primary transfer rollers 17, with its downwardly facing surface of the bottom portion with respect to the belt loop remaining in contact with each transfer roller 17.

Part (c) of FIG. 24 shows the state of the image forming apparatus 100, in which the door 31 is fully open, that is, the opening 30 is fully exposed. When the image forming apparatus 100 is in this state, the belt lifting/lowering members 401L and 401R are in the rear horizontal portions of the belt lifting/lowering member guiding holes 501C, into which of they were moved upward by the connective members 501L and 501R. As for the tension roller 16, it is in its leftmost position, since its lengthwise end portions 16a are fitted in the diagonally elongated holes 90E, with which the main frame 90 is provided. Further, the lengthwise end portions 16a of the tension roller 16 are in the left end portions of the horizontally elongated holes 301D, with respect to the left-right direction of the apparatus main assembly 100A, with which the belt unit frames 301L and 301R are provided. Further the auxiliary roller 15 is in its leftmost position, since its lengthwise end portions 15a are fitted in the diagonally elongated holes 90E, with which the main frame 90 is provided. Further, the lengthwise end portions 15a of the auxiliary roller 15 are in the left ends of the diagonally elongated holes 301E of the belt unit frames 301L and 301R, with respect to the left-right direction of the apparatus main assembly 100A. Since the tension roller 16 and auxiliary roller 15 are moved at the same time, the belt 31 moves, with its tension remaining at roughly the same level. Thus, the downwardly facing surface of the bottom portion of the belt 31, with respect to the belt loop, moves further upward with the primary transfer rollers 17. On the other hand, the driver roller 14 is fixed to the apparatus main frame 90. Thus, it has not changed in its position relative to the apparatus main assembly 100A. As for the lengthwise end portions 16a of the tension roller 16, they are in the bottom ends of the vertically elongated holes 301F, with respect to the vertical direction of the apparatus main assembly 100A, with which the belt unit frames 301L and 301R are provided. Thus, the upwardly facing surface of the top portion of the belt 13 with respect to the belt loop is remaining roughly the same in position. That is, as the tension roller 16 and auxiliary roller 15 are moved, only the bottom portion of the belt 13 with respect to the belt loop, moves upward, that is, without causing the top portion of the belt 13, with respect to the belt loop, to move upward. That is, the bottom portion of the belt 13, with respect to the belt loop, is moved from its contact position to its no-contact position by the movement of the tension roller 16 and auxiliary roller 15, which are the belt suspending/tensioning members.

Thus, it is possible to create the aforementioned space necessary to move the cartridges P upward, and slide the cartridges P frontward. That is, when the apparatus main assembly 100 is in the above-described state, a user can take the cartridges P out of the apparatus main assembly 100A in the frontward direction.

Up to this point, the sequence to make it possible for the cartridges P in the apparatus main assembly 100A to be taken out of the apparatus main assembly 100A through the opening 30 by opening the closed door 31 was described. When the open door 31 is closed, the mechanism for causing the intermediary transfer unit 12 to be moved by the movement of the door 31 reversely follows the above-described sequence, so that the bottom portion of the belt 13 with respect to the belt loop, which is in its noncontact position, is moved to its contact position by the downward movement of the tension roller 16 and auxiliary roller 15.

In the case of this embodiment, the combination of the pair of connective arms 37L and 37R, pair of connective members 501L and 501R, pair of belt lifting/lowering members 401L and 401R, and pair of belt unit frames 301L and 301R makes up the manipulating the endless belt 13. That is, as the door 31 is opened, this endless belt manipulating means causes the movement of the door 31 to move the bottom portion of the belt 13 with respect to the belt loop, to move from its contact position to its noncontact position, whereas as the door 31 is closed, this endless belt manipulating means cause the movement of the door 31 to move the bottom portion of the belt 13 with respect to the belt loop, to move from the noncontact position to the contact position.

Further, the combination of the pair of connective members 501L and 501R, cartridge lifting/lowering member 350, pair of belt lifting/lowering members 401L and 401R, and pair of belt unit frames 301L and 301R makes up the means for moving the bottom portion of the belt 13, with respect to the belt loop, from the contact position to the noncontact position, and moving the cartridge lifting/lowering member 350 from the image formation position to the no-image-formation position. It makes up also the means for moving the bottom portion of the belt 13 from the noncontact position to the contact position by the movement of the door 31, and moving the cartridge lifting/lowering member 350 from the no-image-formation position to the image formation position by the movement of the door 31.

As described above, according to the above-described structural arrangement for an image forming apparatus, the space created by the movement of the bottom portion of the belt 13 of the intermediary transfer unit 12, with respect to the belt loop, is utilized to move the cartridges P in the apparatus main assembly 100A away from the LED unit 11 in order to replace the cartridges P. Therefore, it is possible to provide an image forming apparatus which is no greater in the size of its main assembly than any conventional image forming apparatus, and yet, does not require any operational space, on the top side of its main assembly.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-223132 filed on Nov. 16, 2016, which is hereby incorporated by reference herein in its entirety.

What is claimed is:

1. An image forming apparatus for forming an image on a recording material by forming a toner image on a photosensitive member, comprising:
   a main assembly;
   a cartridge including said photosensitive member;
   an endless belt configured to transfer the toner image formed on said photosensitive member;
   an endless belt supporting member configured to support said endless belt so as to be movable in a contacting position for contacting said photosensitive member and a non-contacting position retracted from the contacting position away from said photosensitive member; and
   a cartridge supporting member dismountably supporting said cartridge and movable between an image forming position in which said photosensitive member contacts said endless belt taking the contacting position and a non-image-forming position in which said cartridge is movable from a inside of said main assembly to a outside of said main assembly,
   wherein by movement of said endless belt from the contacting position to the non-contacting position, a space configured to accommodate at least a part of said cartridge supporting member taking the non-image-forming position and/or said cartridge supported by said cartridge supporting member taking the non-image-forming position is formed,
   wherein said endless belt supporting member includes a plurality of stretching members supporting said endless belt and configured to move to release said endless belt from a stretched state to allow said endless belt to move from the contacting position to the non-contacting position by a weight of said endless belt.

2. An apparatus according to claim 1, wherein said endless belt supporting member includes a plurality of stretching members supporting said endless belt and configured to move said endless belt from the contacting position to the non-contacting position.

3. An apparatus according to claim 1, further comprising an interrelating mechanism for interrelating said endless belt supporting member and said cartridge supporting member with each other, wherein said interrelating means interrelates movement of said endless belt from the contacting position toward the non-contacting position in movement of said cartridge supporting member from the image forming position toward the non-image-forming position, and interrelates movement of said endless belt from the non-contacting position toward the contacting position and movement of said cartridge supporting member from the non-image-forming position toward the image forming position.

4. An apparatus according to claim 1, further comprising an opening configured to allow said cartridge to pass through said opening when said cartridge is removed from said main assembly, an openable member configured to open and close said opening, an endless belt operating mechanism configured to interrelate said endless belt supporting member with opening and closing operation of said openable member, to move said endless belt from the contacting position to the non-contacting position in interrelation with and opening operation of said openable member, and to move said endless belt from the non-contacting position to the contacting position in interrelation with closing operation of said openable member.

5. An apparatus according to claim 4, further comprising a cartridge operating mechanism configured to interrelate said cartridge supporting member with the opening and closing operation of said openable member, to move said cartridge supporting member from the image forming position to the non-image-forming position in interrelation with the opening operation of said openable member, and to move said cartridge supporting member from the non-image-forming position to the image forming position in interrelation with the closing operation of said openable member.

6. An apparatus according to claim 1, further comprising a plurality of tray holding members configured to support said cartridge supporting member so as to be movable between an inside of said main assembly and an outside of the main assembly.

7. An apparatus according to claim 1, further comprising a light emission member for exposing said photosensitive member to light at a position across said photosensitive member from said endless belt.

8. An apparatus according to claim 7, wherein said cartridge is in a position away from said light emission member when said cartridge supporting member is in the non-image-forming position.

9. An apparatus according to claim 1, wherein said cartridge supporting member is movable to an outside of said main assembly when said cartridge supporting member is in the non-image-forming position.

10. An apparatus according to claim 1, wherein said cartridge supporting member is configured to support a plurality of said cartridges.

* * * * *